(12) United States Patent
Lee et al.

(10) Patent No.: US 11,924,950 B2
(45) Date of Patent: Mar. 5, 2024

(54) COOKER

(71) Applicant: LG ELECTRONICS INC., Seoul (KR)

(72) Inventors: Seonghun Lee, Seoul (KR); Bongsik Kwak, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 439 days.

(21) Appl. No.: 17/261,412

(22) PCT Filed: Jan. 4, 2019

(86) PCT No.: PCT/KR2019/000167
§ 371 (c)(1),
(2) Date: Jan. 19, 2021

(87) PCT Pub. No.: WO2020/080610
PCT Pub. Date: Apr. 23, 2020

(65) Prior Publication Data
US 2021/0267022 A1    Aug. 26, 2021

(30) Foreign Application Priority Data
Oct. 19, 2018    (KR) .................. 10-2018-0125430

(51) Int. Cl.
*H05B 6/06* (2006.01)
*H05B 6/04* (2006.01)
*H05B 6/12* (2006.01)

(52) U.S. Cl.
CPC ............. *H05B 6/062* (2013.01); *H05B 6/04* (2013.01); *H05B 6/1236* (2013.01)

(58) Field of Classification Search
CPC .... H02J 50/10; H02J 7/007182; H02J 7/0048; H05B 6/1236; H05B 6/062; H05B 6/04; H05B 2213/06
See application file for complete search history.

(56) References Cited

U.S. PATENT DOCUMENTS 6,534,753 B1    3/2003    Boyd et al.
2012/0000903 A1    1/2012    Baarman et al.

FOREIGN PATENT DOCUMENTS

| | | |
|---|---|---|
| EP | 3 338 437 A1 | 6/2018 |
| KR | 10-1442642 B1 | 9/2014 |
| KR | 10-1656115 B1 | 9/2016 |
| KR | 10-2017-0037473 A | 4/2017 |
| KR | 20170037473 * | 4/2017 |
| KR | 10-2017-0072842 A | 6/2017 |
| KR | 20170100146 A * | 9/2017 |
| KR | 10-1807826 B1 | 12/2017 |
| WO | WO 2010/093973 A2 | 8/2010 |
| WO | WO 2017/038013 A1 | 3/2017 |
| WO | WO 2018/093004 A1 | 5/2018 |

* cited by examiner

*Primary Examiner* — Dana Ross
*Assistant Examiner* — Kuangyue Chen
(74) *Attorney, Agent, or Firm* — Birch, Stewart, Kolasch & Birch, LLP

(57) ABSTRACT

The present specification relates to a cooker, wherein a separate-type cooking module is arranged above a fixed-type cooking module to be charged with power or operated, and when used separately, the separate-type cooking module and the fixed-type cooking module are respectively operated.

12 Claims, 12 Drawing Sheets

FIG. 8A
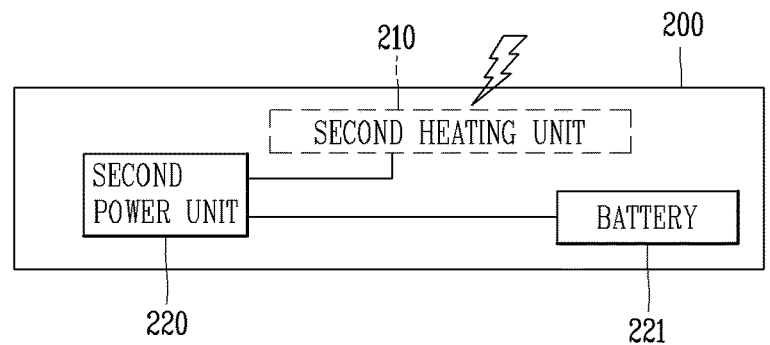
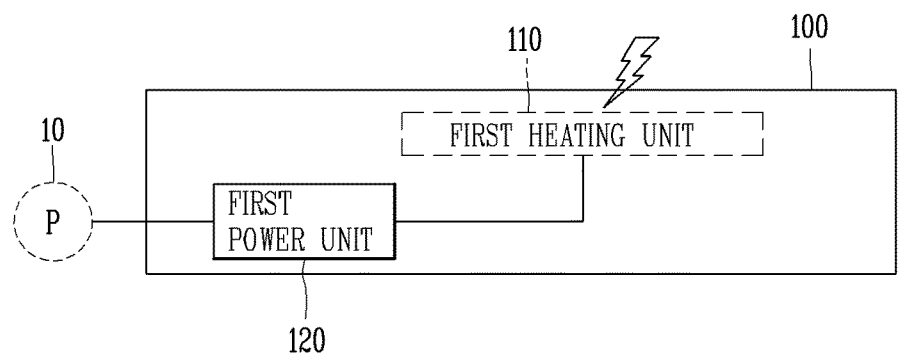
FIG. 8B
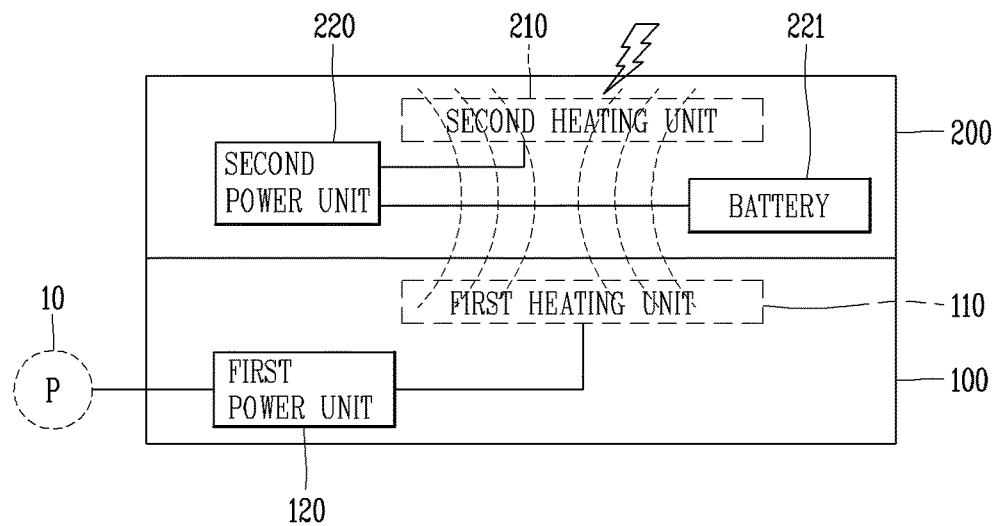

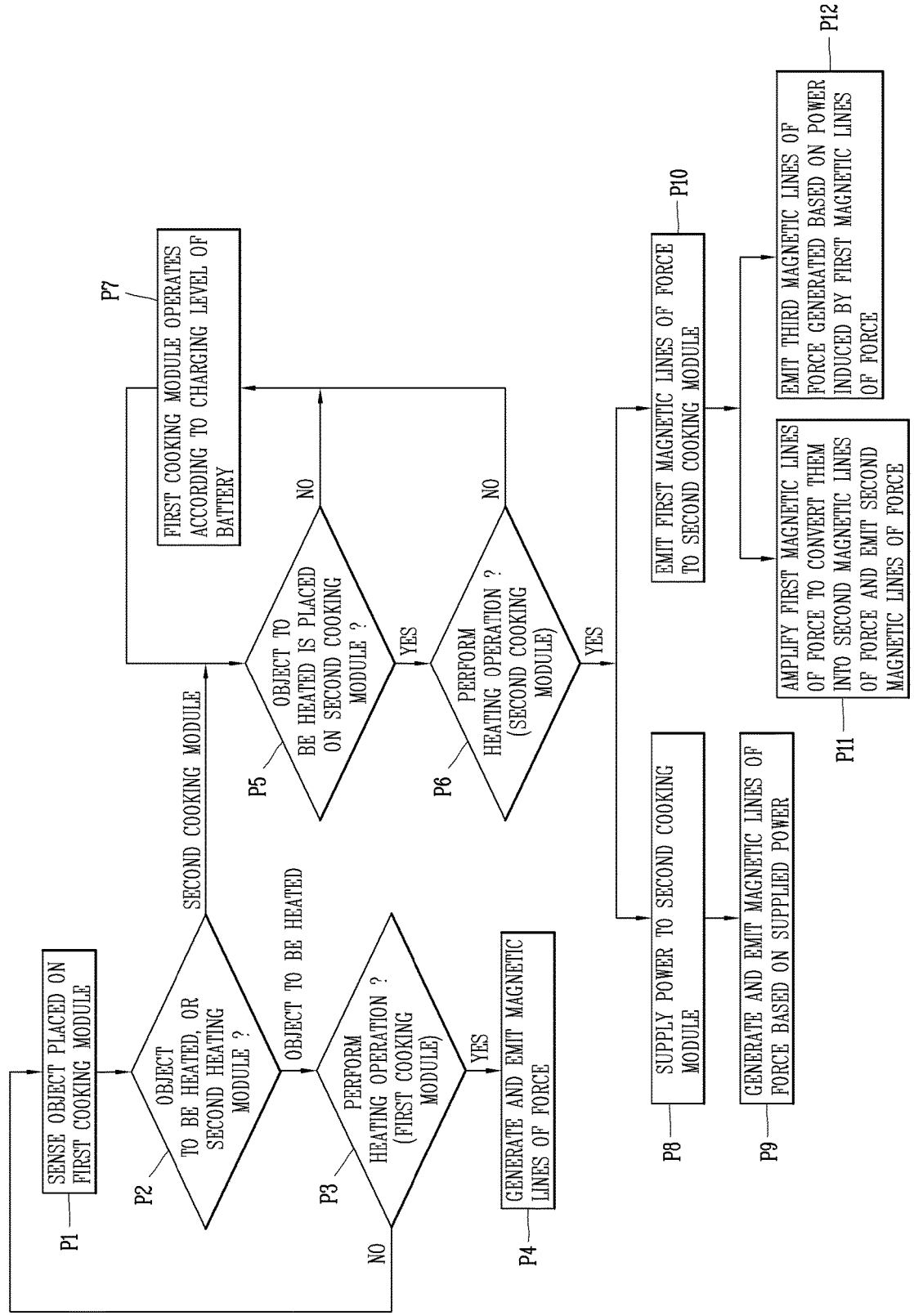

COOKER

CROSS-REFERENCE TO RELATED APPLICATIONS

This application is the National Stage filing under 35 U.S.C. 371 of International Application No. PCT/KR2019/000167, filed on Jan. 4, 2019, which claims the benefit of earlier filing date and right of priority to Korean Application No. 10-2018-0125430 filed on Oct. 19, 2018, the entire contents of all these applications are all hereby incorporated by reference herein in their entirety.

TECHNICAL FIELD

The present disclosure relates to a cooker or cooking appliance that heats an object to be heated using an induction heating method.

BACKGROUND

A background art of the present disclosure is a cooking appliance that heats an object to be heated.

A cooking appliance is one of home or household appliances for cooking food in a cooking vessel by heating the cooking vessel using a heat source. According to heat source types, cooking appliances can be classified into a gas-operated cooking appliance such as a gas stove and a gas oven, and an electric powered cooking appliance such as a microwave oven (or microwave), an electric oven, and an induction cooker. Microwave ovens or electric ovens are cooking appliances (or devices) that use microwaves to heat and cook food. Microwaves, generated by a magnetron to which a high voltage is applied, are radiated or emitted to food in a cooking cavity through a waveguide, causing water molecules in the food to vibrate to thereby produce heat (thermal energy) for cooking the food.

Among these cooking appliances, the conventional induction cooker having a plurality of cooking zones (or heating surfaces) #1 to #3, as illustrated in FIGS. 1A and 1B, uses a multi-coil method. Such a cooker 1 using a multi-coil method is generally implemented as a built-in induction cooker due to limitations such as complexity of an induction heating system and weight, and the like.

Korean Patent Laid-Open Application No. 10-2017-0037473 (published on Apr. 04, 2017, hereinafter referred to as "Patent Document 1") discloses a cooktop with easy portability.

In the Patent Document 1, the cooktop is configured as a package form that is easy to carry, however it cannot be provided as a built-in feature in a kitchen as it is designed for a portable use. That is, a portable cooking module disclosed in the Patent Document 1 has limitations in terms of applicability/utility. In addition, as for the induction cooktop, manufacturing costs are relatively high due to its systemic complexity, and thus manufacturing such an induction cooktop only for a portable use causes an economic (or financial) loss.

Korean Patent Laid-Open Application No. 10-2017-0072842 (published on Jun. 27, 2017, hereinafter referred to as "Patent Document 2") discloses a detachable electric cooktop capable of being coupled to a built-in electric cooktop.

In the Patent Document 2, a portable electric cooktop can be used in a combined manner by being coupled to a fixed electric cooktop (built-in cooktop). However, there is a problem in supplying power to the portable electric cooktop when it is used for a portable use. As the portable electric cooktop is simply coupled to the fixed electric cooktop, there is a spatial limitation of an installed space. In addition, since two cooktops are simply coupled to each other for use, usability and utility in the number of available use for cooking zones (increase/maintain) and portable/separate use are not fundamentally improved. Further, the portable electric cooktop should be purchased in addition to the fixed electric cooktop, thereby having economic constraints.

Therefore, the related art induction cookers have limitations in terms of usability/applicability/efficacy/efficiency/economic efficiency of the portable cooking module, and an appropriate cooking module for a portable use is not provided. In addition, even for a portable cooking module that is used by being coupled to a fixed cooking module, the potable cooking module cannot be usefully used due to operation and usability problems and limitations in installation and use.

DISCLOSURE

Technical Problem

An aspect of the present disclosure is to overcome limitations of the related art described above.

That is, the present disclosure is directed to providing a cooking appliance capable of addressing the limitations of the related art.

More specifically, the present disclosure is directed to providing a cooking appliance capable of easily coupling and separating a detachable cooking module to and from a fixed cooking module.

Another aspect of the present discourse is to provide a cooking appliance having a detachable cooking module with easy portability.

Still another aspect of the present disclosure is to provide a cooking appliance capable of increasing or maintaining the number of available cooking zones (heating surfaces) by allowing a detachable cooking module to be easily coupled and separated to and from a fixed cooking module.

Still another aspect of the present disclosure is to provide a cooking appliance capable of easily charging power for operating a detachable cooking module, and easily controlling power for performing heating operation when the detachable cooking module is used in a combined manner by being coupled to a fixed cooking module.

Technical Solution

The embodiments disclosed herein provide a cooking appliance configured to operate such that a detachable cooking module is disposed on a fixed cooking module.

In detail, a detachable cooking module provided with a battery may be disposed on a fixed cooking module operated by a commercial power source, so that power is supplied or induced into the detachable cooking module as the fixed cooking module is operated, enabling charging and operation of the detachable cooking module.

That is, in the cooking appliance according to the present disclosure, when the detachable cooking module and the fixed cooking module are used in a combined manner, the detachable cooking module may be disposed on the fixed cooking module to charge power or operate, and when the detachable cooking module and the fixed cooking module are used in separate manner, the detachable cooking module and the fixed cooking module may be individually or separately operated.

Accordingly, in the cooking appliance according to the present disclosure, when the detachable cooking module and the fixed cooking module are used in a combined manner, the detachable cooking module may be disposed on the fixed cooking module to charge power or to operate, and when the detachable cooking module and the fixed cooking module are used in a separate manner, the detachable cooking module and the fixed cooking module may be individually operated, thereby solving the above-described problems.

The above-described technical features may be implemented by being applied to a cooking appliance, a cooking module, an operation (or operating) system of a cooking appliance, and the like, and embodiments 1 to 3 of cooking appliances using the above-described technical features are provided.

A cooking appliance according to the embodiment 1 of the present disclosure, which is a first cooking appliance, may correspond to a cooking module on which a second cooking module is disposed to be operated in a combined manner, or that is operated by being separated from the second cooking appliance.

The first cooking appliance may include a first heating unit configured to generate and emit magnetic lines of force, a first power unit configured to convert power supplied from a power supply source into driving power of the first heating unit and supply the driving power to the first heating unit, and a first control unit configured to control heating operation of the first cooking appliance by controlling operation of the first heating unit and power supply of the first power unit. The first control unit may control the first heating unit and the first power unit such that power flows in a second cooking appliance when the second cooking appliance operated by power charged in a battery is disposed on the first heating unit.

The first cooking appliance may be a fixed cooking appliance to which a detachable cooking appliance is coupled.

The first cooking appliance may be implemented as a combination of one or more of the embodiments 2 and 3 of the cooking appliances to be described hereinafter, or the embodiment 1 may be independently implemented.

In addition, a cooking appliance according to the embodiment 2 of the present disclosure, which is a second cooking appliance, may be a cooking module disposed on the first cooking appliance to be operated, or operated by being separated from the first cooking appliance.

The second cooking appliance may include a second heating unit configured to generate and emit magnetic lines of force, a second power unit provided with a battery so as to convert power charged in the battery into driving power of the second heating unit and supply the driving power to the second heating unit, and a second control unit configured to control heating operation of the second cooking appliance by controlling operation of the second heating unit and power supply of the second power unit. When the second cooking appliance is disposed on a first cooking appliance operated by power supplied from a power supply source, the second control unit may control the second heating unit and the second power unit so that the heating operation is performed based on power of the first cooking appliance.

The second cooking appliance may be a detachable cooking appliance that is coupled to a fixed cooking appliance.

The second cooking appliance may be implemented as a combination of one or more of the embodiment 1 of the first cooking appliance and the embodiment 3 of the cooking appliance to be described hereinafter, or the embodiment 1 may be independently implemented.

The cooking appliance according to the embodiment 3 of the present disclosure, which is a cooking appliance having a plurality of cooking modules (units), may correspond to a cooking appliance that includes the first cooking appliance and the second cooking appliance.

The cooking appliance having the plurality of cooking modules may include a first cooking module operated by power supplied from a power supply source and a second cooking module disposed on the first cooking module or operated by being separated from the first cooking module. When the second cooking module is disposed on the first cooking module, the second cooking module may be operated by power flowing therein as the first cooking module is operated. When the second cooking module is separated from the first cooking module, the second cooking module may be operated by power charged in a built-in battery.

The cooking appliance having the plurality of cooking modules may be a cooking appliance that includes a fixed cooking appliance and a detachable cooking appliance.

The cooking appliance having the plurality of cooking modules may be implemented as a combination of one or more of the first cooking appliance and the second cooking appliance, or the third embodiment may be independently implemented.

Meanwhile, the above-described technical features may be embodied as an operation (or driving) method applied to the cooking appliance as described above.

The operation method may be a method of operating the cooking appliance or a system for operating the cooking appliance, the operation method may include disposing a second cooking module on a first cooking module, determining at least one of a charging level of a battery of the second cooking module and whether to perform heating operation by the second cooking module, operating the first cooking module to cause power to flow in the second cooking module according to a result of the determination, and performing at least one of charging the battery and the heating operation by the second cooking module according to a result of the operation.

The cooking appliance according to the present disclosure may be applied to a detachable cooking module, a fixed cooking module, a cooking appliance that includes a detachable cooking module and a fixed cooking, a system of operating a cooking appliance, a method of operating a cooking appliance, and the like. However, the technology disclosed in this specification is not limited thereto and may be implemented as any cooking appliance to which the technical idea of the above-described technology can be applied.

Advantageous Effects

In a cooking appliance according to the embodiments of the present disclosure, when a detachable cooking module and a fixed cooking module are used in a combined manner, the detachable cooking module may be disposed on the fixed cooking module to charge power or operate, and when the detachable cooking module and the fixed cooking module are used in a separate manner, the detachable cooking module and the fixed cooking module may be operated individually, enabling coupling and separation of the detachable cooking module to and from the fixed cooking module in an easier manner.

In the cooking appliance according to the present disclosure, the detachable cooking module may provide easy portability, allowing the number of available cooking zones (heating surfaces) to be increased and maintained according to the usage condition (or purpose of use).

Accordingly, in the cooking appliance according to the present disclosure, spatial/structural limitations or constraints of an installed environment may be reduced, thereby increasing usability/utility/convenience of the cooking appliance.

In the cooking appliance according to the present disclosure, as the detachable cooking module is disposed on the fixed cooking module, power charging and operation of the detachable module may be performed in an easier manner.

In the cooking appliance according to the present disclosure, as the fixed cooking module enables easier charging and operation of the detachable cooking module, the detachable cooking module may be stably operated through charged power when the detachable cooking module is separated from the fixed cooking module for a portable use.

That is, the cooking appliance according to the present disclosure may enhance stability, utility, and usability in portable use of the detachable cooking module.

Further, in the cooking appliance according to the present disclosure, when the detachable cooking module and the fixed cooking module are used in a combined manner, the detachable cooking module may be disposed on the fixed cooking module to charge power or operate, and when the detachable cooking module and the fixed cooking module are used in a separate manner, the detachable cooking module and the fixed cooking module may be individually operated, enabling smooth cooking operation for both separate and combined use of the detachable cooking module and the fixed cooking module.

Therefore, the cooking appliance according to the present disclosure may address the above-described problems and overcome the limitations of the related art.

BRIEF DESCRIPTION OF THE DRAWINGS

FIG. 8A illustrates an operation example 3a of cooking appliances according to an embodiment of the present disclosure.

FIG. 8B illustrates an operation example 3b of cooking appliances according to an embodiment of the present disclosure.

FIG. 12 is a flow chart illustrating an operation process of a cooking appliance according to an embodiment of the present disclosure.

DETAILED DESCRIPTION

Figure 1A:
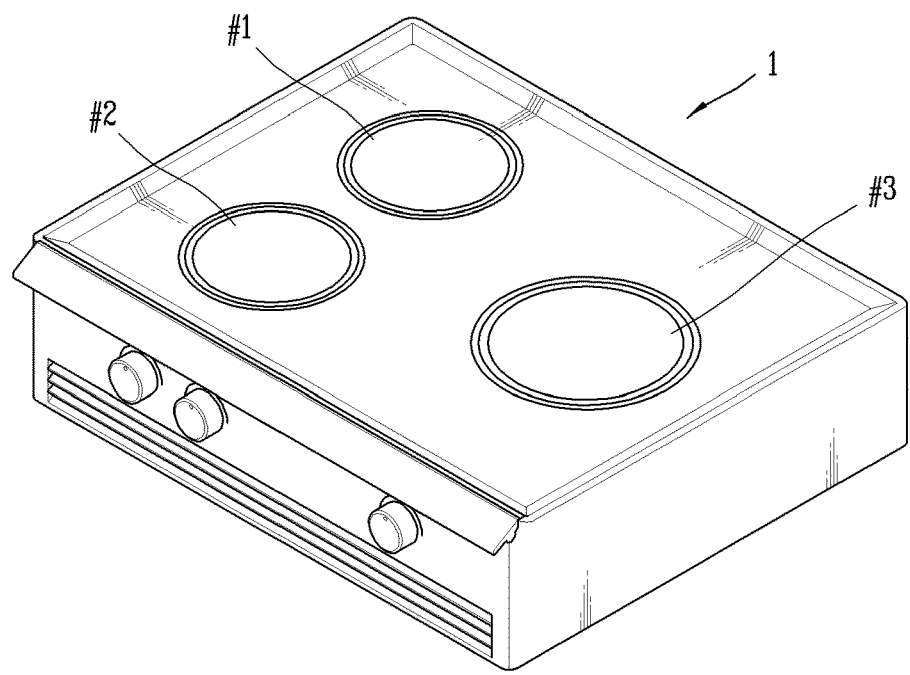
FIGS. 1A and 1B are exemplary views illustrating a configuration of the related art multi-coil induction heating appliance.
Figure 1B:
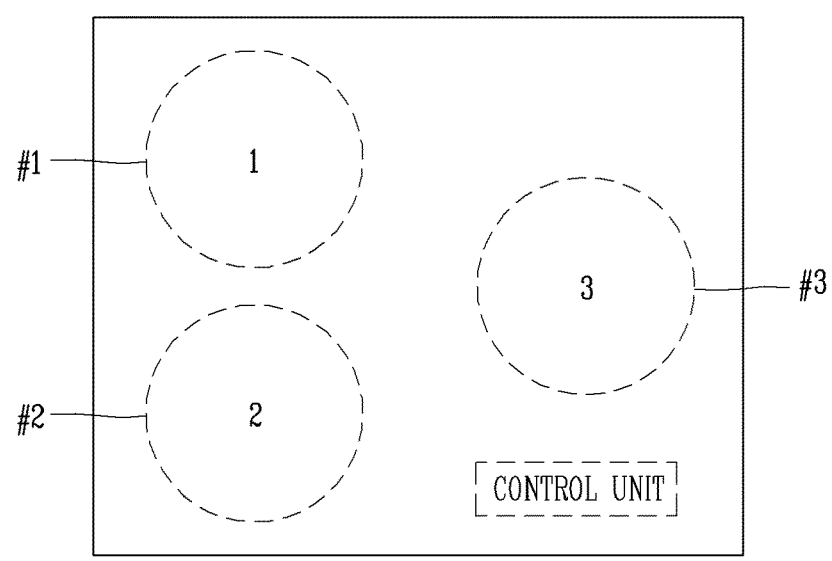

Description will now be given in detail according to one or more implementations disclosed herein, with reference to the accompanying drawings. For the sake of brief description with reference to the drawings, the same or equivalent components may be provided with the same or similar reference numbers, and description thereof will not be repeated.

In describing the present disclosure, if a detailed explanation for a related known function or construction is considered to unnecessarily divert the main point of the present disclosure, such explanation has been omitted but would be understood by those skilled in the art. It should be noted that the attached drawings are provided to facilitate understanding of the embodiments disclosed in this specification, and should not be construed as limiting the technical idea disclosed in this specification by the attached drawings.

Hereinafter, for convenience of description, embodiments of cooking appliances disclosed herein will be described in order, and overlapping description in the embodiments will be omitted as much as possible.

First Cooking Appliance—First Embodiment

First, a first cooking appliance (or cooker) according to the present disclosure, namely a first embodiment will be described.

The [first cooking appliance] according to the present disclosure may be implemented as a part of configurations or steps included in the following embodiments or a combination thereof, or implemented as a combination of embodiments. Technical terms used in this specification are used to merely illustrate specific embodiments, and therefore it should be understood that they are not intended to limit the present disclosure.

The first cooking appliance refers to a cooking appliance that heats an object to be heated or a heating object or target (hereinafter, "heating object") by an induction heating method.

The first cooking appliance may be an induction heating appliance that radiates or emits magnetic lines of force (or lines of magnetic force), which is a heat source of induction heating, to a heating object, causing an induced current (eddy current) to flow in the heating object to thereby heat the heating object using the induced current.

The first cooking appliance may be formed as a single module.

The first cooking appliance may be a cooking appliance that is included in a cooking appliance having a plurality of cooking modules.

That is, the first cooking appliance may be included in another cooking appliance, or may be combined with another cooking appliance.

For example, the first cooking appliance may be combined with a second cooking appliance that is a detachable cooking module.

Hereinafter, for the sake of convenience, a first cooking appliance 100 will be referred to as "first cooking appliance" to distinguish it from a second cooking appliance (second embodiment) coupled to the first cooking appliance 100, and a cooking appliance (third embodiment) that includes the first cooking appliance and the second cooking appliance.

Figure 2:
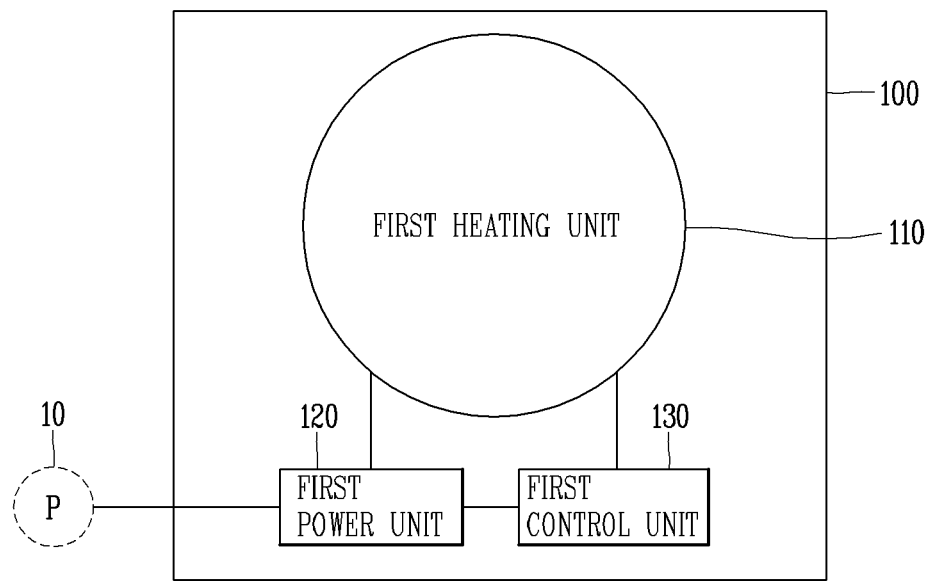
FIG. 2 is a conceptual view illustrating a configuration of a first cooking appliance according to the present disclosure.

As illustrated in FIG. 2, the first cooking appliance 100 includes a first heating unit 110 that generates and emits magnetic lines of force, a first power unit 120 that supplies driving power to the first heating unit 110 by converting power received from a power supply source 10, and a control unit (or controller) 130 that controls heating operation of the first cooking appliance 100 by controlling operation (or driving) of the first heating unit 110 and power supply of the first power unit 120.

The first cooking appliance 100 may be a fixed (or stationary) cooking appliance.

The first cooking appliance 100 may be a fixed cooking module coupled to a cooking appliance that includes a plurality of cooking modules.

The first cooking appliance 100 may be a fixed cooking module provided as a built-in feature (type).

The first cooking appliance 100 may be combined with a detachable cooking module.

A second cooking appliance 200, as illustrated in FIG. 2, may be disposed on the first cooking appliance 100.

Figure 3:
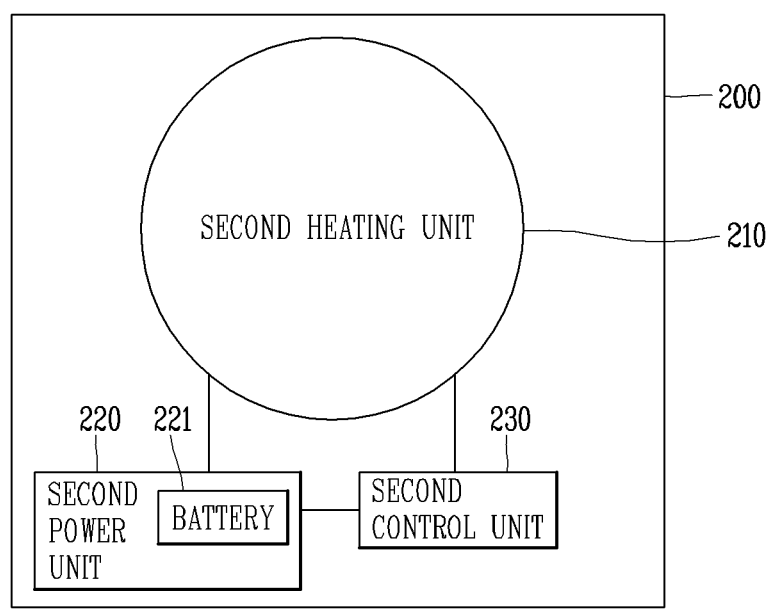
FIG. 3 is a conceptual view illustrating a configuration of a second cooking appliance according to the present disclosure.

When the second cooking appliance 200 operated by power stored in a battery 221 is disposed on the first cooking appliance 110 as illustrated in FIG. 3, the first control unit 130 of the first cooking appliance 100 controls the first heating unit 110 and the first power unit 120 such that power flows in the second cooking appliance 200.

Figure 4A:
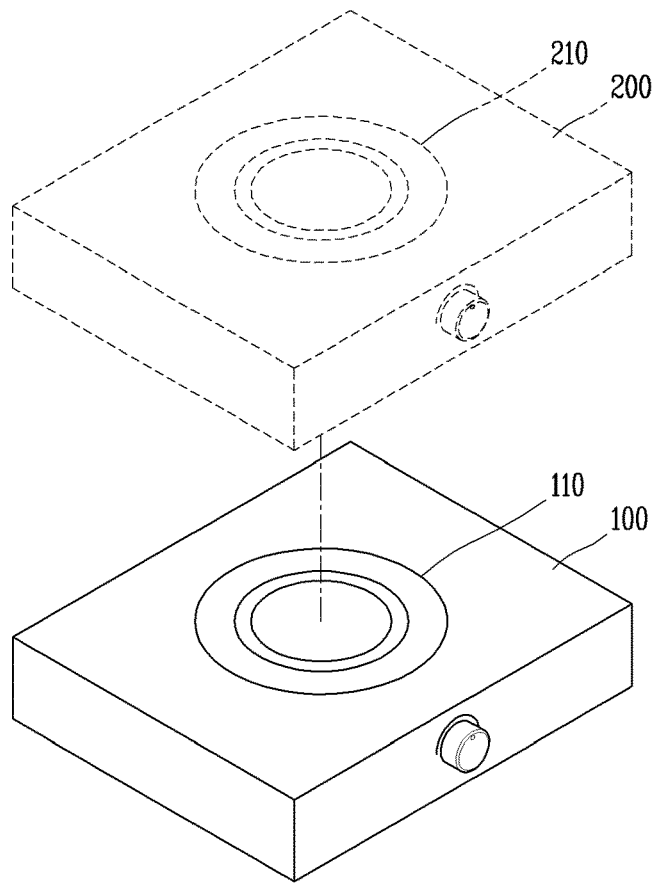
FIG. 4A is a perspective view illustrating an example of separate use of cooking appliances according to an embodiment of the present disclosure.
Figure 4B:
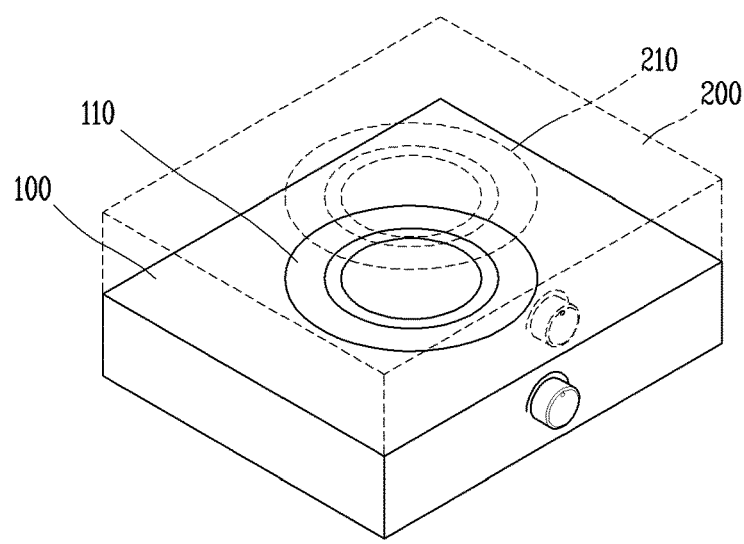
FIG. 4B is a perspective view illustrating an example of combined use of cooking appliances according to an embodiment of the present disclosure.

That is, when the second cooking appliance 200 is disposed on the first heating unit 110, as illustrated in FIG. 4A or 4B, the first cooking appliance 100 may be operated such that power flows in the second cooking appliance 200.

Here, the second cooking appliance 200 may be disposed on the first cooking appliance 100, that is the second cooking appliance 200 may be disposed to be stacked on the first heating unit 110.

The second cooking appliance 200 may have the same dimension (or size) as the first cooking appliance 100 so as to be disposed on the first heating unit 110 in a stacked manner.

The first heating unit 110 may be a cooking zone of the first cooking appliance 100.

The first heating unit 110, which is provided on an upper surface of the first cooking appliance 100, may be a cooking zone that heats a heating object placed on the upper surface of the first cooking appliance 100.

The first heating unit 110 may be a cooking zone that heats the heating object by an induction heating method.

The first heating unit 110 may heat the heating object by emitting the magnetic lines of force, which is a heat source of induction heating, to the heating object.

The first heating unit 110 may include a coil that generates and emits the magnetic lines of force.

The first heating unit 110 may generate the magnetic lines of force based on the driving power and emit the magnetic lines of force to an upper part thereof.

When the driving power is applied to the coil, magnetic lines of force (magnetic field) is generated in the coil by the driving power. Then, the first heating unit 110 may emit the generated magnetic lines of force to an upper part of the first cooking appliance 100, allowing the heating object placed thereon to be heated.

The first heating unit 110 may be controlled by the first control unit 130.

The first power unit 120 may be a power element of the first cooking appliance 100.

The first power unit 120 may be connected to the power supply source 10 to receive power from the power supply source 10.

Here, the power supply source 10 may refer to a commercial power source.

That is, the first cooking appliance 100 may be operated by power supplied from a commercial power source.

The first power unit 120 may be connected to the first heating unit 110 so as to supply the driving power to the first heating unit 110.

The first power unit 120 may be connected to the power supply source 10 and the first heating unit 110, so as to covert power supplied from the power supply source 10 into the driving power, allowing the driving power to be applied to the coil of the first heating unit 110.

The first power unit 120 may apply the driving power to the coil of the first heating unit 110 so that the magnetic lines of force is generated in the coil by the driving power.

The first power unit 120 may be controlled by the first control unit 130.

The first control unit 130 may be a control element of the first cooking appliance 100.

The first control unit 130 may control operation of the first heating 20 unit 110 and power supply of the first power unit 120, so as to control the heating operation of the first cooking appliance 100, which is performed by the first heating unit 110.

The heating operation may refer to heating the heating object when the heating object is placed on the first heating unit 110.

That is, the heating operation may be refer to generating the magnetic lines of force by receiving the driving power from the first power unit 120, and emitting the generated magnetic lines of force to the heating object.

The first control unit 130 may control operation of the first heating unit 110 and power supply of the first power unit 120 according to an operating state (or status) of the first cooking appliance 100.

When the second cooking appliance 200 is not disposed on the first heating unit 110, the first control unit 130 may control operation of the first heating unit 110 and power supply of the first power unit 120 so that the heating operation is performed by the first heating unit 110.

That is, when the second cooking appliance 200 is separated from the first cooking appliance 100, the first heating unit 110 may heat the heating object.

When the second cooking appliance 200 is disposed on the first heating unit 110, the first control unit 130 may control operation of the first heating unit 110 and power supply of the first power unit 120 so that the heating operation is performed by the second cooking appliance 200.

That is, when the second cooking appliance 200 is disposed on the first cooking appliance 100, the first control unit 130 may control operation of the first heating unit 110 and power supply of the first power unit 120 so that power flows in the second cooking appliance 200, allowing the second cooking appliance 200 to perform the heating operation.

Figure 5A:
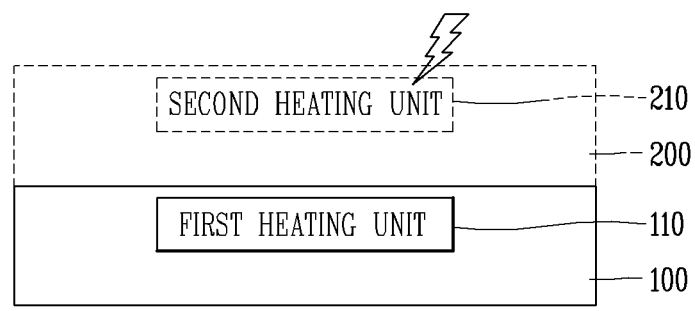
FIG. 5A illustrates an operation example of cooking appliances according to an embodiment of the present disclosure, when used in a combined manner.

When the second cooking appliance 200 is disposed on the first heating unit 110, that is, when the second cooking appliance 200 is coupled to the first cooking appliance 100 as illustrated in FIG. 5A, the first cooking appliance 100 may operate such that the heating operation is performed by the second cooking appliance 200. When the second cooking appliance 200 is separated from the first cooking appliance 100 as illustrated in FIG. 5B, the first heating unit 110 may perform the heating operation based on power supplied from the power supply source 10.

Figure 5B:
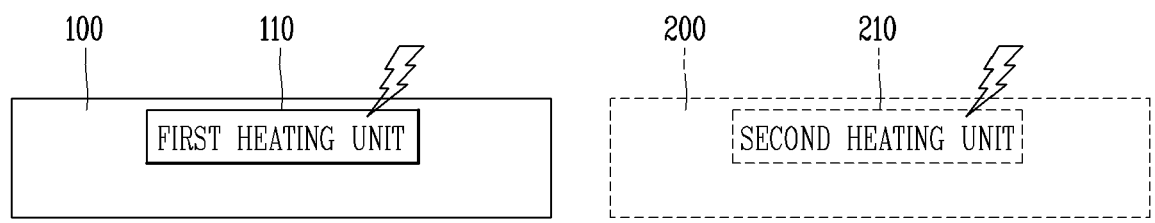
FIG. 5B illustrates an operation example of cooking appliances according to an embodiment of the present disclosure, when used in a separate manner.

That is, the first cooking appliance 100 and the second cooking appliance 200 may be configured such that heating operation is performed by the second cooking appliance 200 when the second cooking appliance 200 is disposed on the first cooking appliance 100 as illustrated in FIG. 5A, and heating operations are performed by the first cooking appliance 100 and the second cooking appliance 200, respectively, when they are separated from each other as illustrated in FIG. 5B.

When the second cooking appliance 200 is disposed on the first heating unit 110, the upper surface of the first cooking appliance 100 on which the first heating unit 110 is provided may be in contact with a lower surface of the second cooking appliance 200, as illustrated in FIG. 5A.

That is, when the second cooking appliance 200 is coupled to the first cooking appliance 100, the first heating unit 110 that corresponds to the upper surface of the first cooking appliance 100 may be in contact with the lower surface of the second cooking appliance 200.

As for the first cooking appliance 100 to and from which the second cooking appliance 200 is coupled or separated may further include a contact portion 140 that is in contact with the second cooking appliance 200.

Figure 6A:
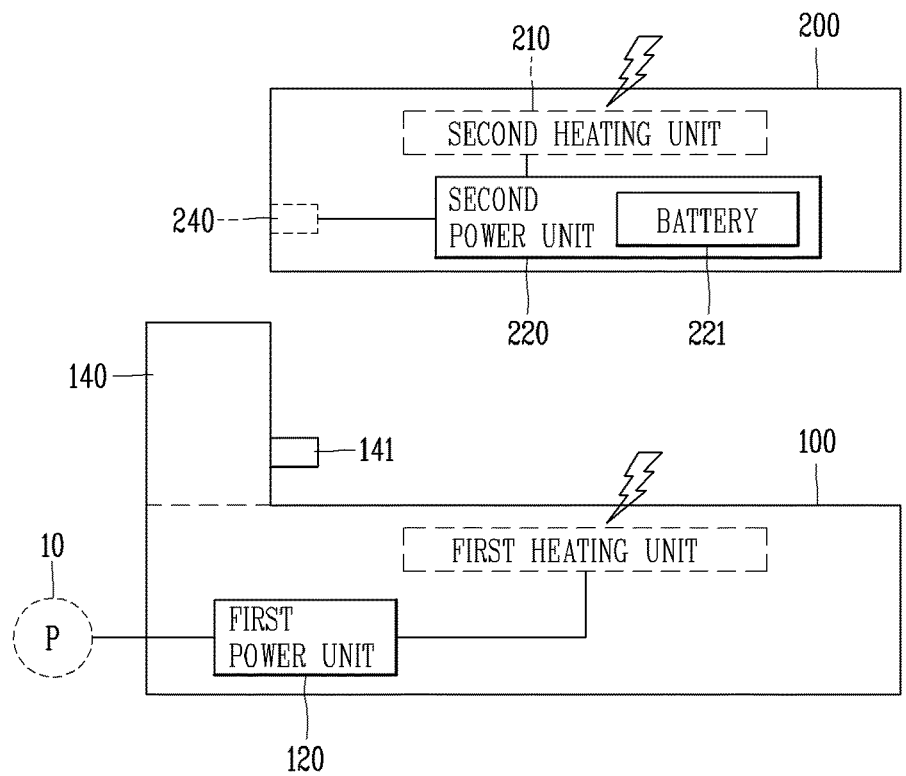
FIG. 6A illustrates an operation example 1a of cooking appliances according to an embodiment of the present disclosure.
Figure 6B:
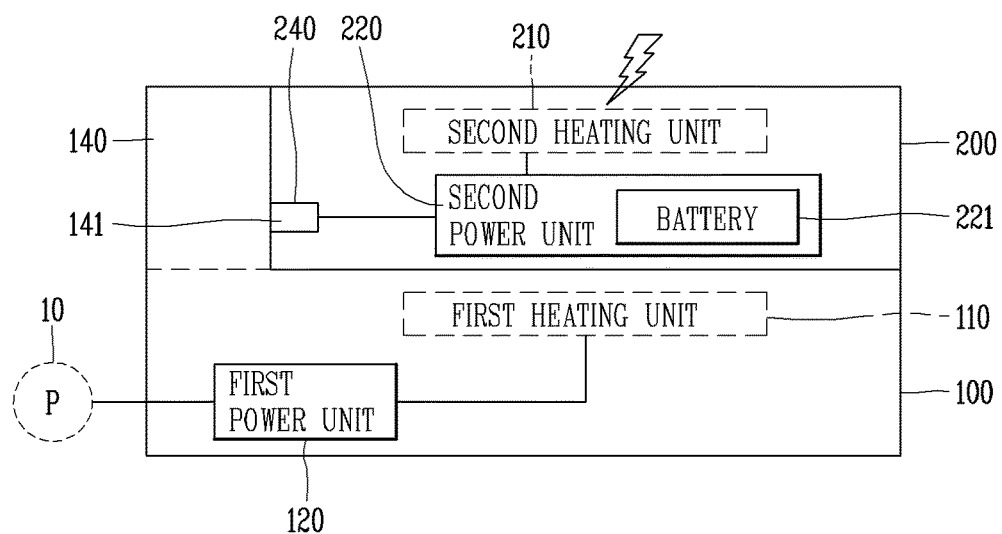
FIG. 6B illustrates an operation example 1b of cooking appliances according to an embodiment of the present disclosure.

As illustrated in FIGS. 6A and 6B, the contact portion 140 may protrude from one side of the first heating unit 110 in its height direction, so as to be in contact with the second cooking appliance 200.

When the contact portion 140 is provided at one side of the first heating unit 110 to protrude in its height direction as illustrated in FIG. 6A, the contact portion 140 may support the second cooking appliance 200 disposed on the first heating unit 110 as illustrated in FIG. 6B.

That is, the contact portion 140 may support a side surface of the second cooking appliance 200 in contact therewith as the second cooking appliance 200 is disposed on the first heating unit 110.

The first cooking appliance 100 may further include a contact 141 that is brought into contact with one point of the second cooking appliance 200 so as to be electrically connected to the second cooking appliance 200.

The contact 141 may be a contact terminal that is electrically connected to the second cooking appliance 200.

The contact 141 may be provided at the upper surface of the first cooking appliance 100 in a direction to be in contact with one point of the lower surface of the second cooking appliance 200.

Figure 7A:
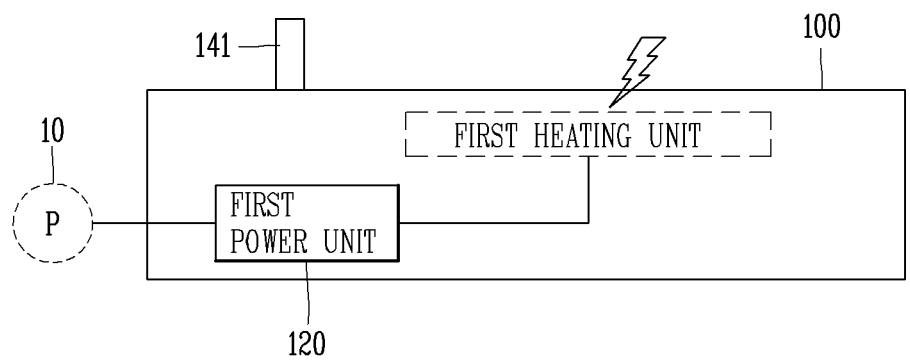
FIG. 7A illustrates an operation example 2a of cooking appliances according to an embodiment of the present disclosure.

As illustrated in FIG. 7A, the contact 141 may be provided at the upper surface of the first cooking appliance 100 to protrude in a direction to be in contact with one point of the lower surface of the second cooking appliance 200.

At least one contact 141 may be provided at the upper surface of the first cooking appliance 100 in a direction to be in contact with the second cooking appliance 200.

As illustrated in FIG. 6A, when the first cooking appliance 100 includes the contact portion 140, the contact 141 may be provided at the contact portion 140 that is brought into contact with one side surface of the second cooking appliance 200.

When the contact 141 is provided at the contact portion 140 to be in contact with the second cooking appliance 200 as illustrated in FIG. 6B, the contact 141 may prevent vertical movement of the second cooking appliance 200.

That is, the contact 141 may be a fixing element that fixes the second cooking appliance 200 disposed on the first heating unit 110.

When the second cooking appliance 200 is disposed on the first heating unit 110, the contact 141 may be in contact with a connection portion 240 formed on a side surface of the second cooking appliance 200.

When the contact 141 is brought into contact with the second cooking appliance 200, the contact 141 may be electrically connected to the second cooking appliance 200, causing power to flow therethrough.

Here, the first control unit 130 may detect the second cooking appliance 200 in contact with the contact 141 to determine the presence and absence of the second cooking appliance 200.

That is, the contact 141 may be a sensing element that senses the second cooking appliance 200 disposed on the first heating unit 110.

The contact 141 may be connected to at least one of the power supply source 10 and the first power unit 120, so as to provide electrical connection between the second cooking appliance 200 and the at least one of the power supply source 10 and the first power unit 120.

That is, the second cooking appliance 200 may be electrically connected to the at least one of the power supply source 10 and the first power unit 120 through the contact 141.

The first control unit 130 controls such that power is supplied to the second cooking appliance 200 from at least one of the power supply source and the first power unit 120 through the contact 141.

The first control unit 130 controls power feeding of the contact 141 in contact with the second cooking appliance 200 so that power is supplied to the second cooking appliance 200 from the at least one of the power supply source 10 and the first power unit 120.

When the contact 141 is brought into contact with the second cooking appliance 200, the contact 141 may provide electrical connection between the second cooking appliance 200 and at least one of the power supply source 10 and the first power unit 120 so that power is supplied to the second cooking appliance 200 from the at least one of the power supply source 10 and the first power unit 120.

That is, when the second cooking appliance 200 is disposed on the first heating unit 110, the second cooking appliance 200 may receive power from the at least one of the power supply source 10 and the first power unit 120 through the contact 140.

Here, the second cooking appliance 200 may perform the heating operation using power received from the at least one of the power supply source 10 and the first power unit 120 through the connection portion 240.

The first cooking appliance 100 may further include a sensor or sensing unit (not shown) that senses an object placed on the first heating unit 110.

When the first cooking appliance 100 includes the sensor, the second cooking appliance 200 disposed on the first heating unit 110, or the heating object may be sensed by the sensor.

In this case, the first control unit 130 may control the first heating unit 110 and the first power unit 120 according to a sensing result of the sensor.

The first control unit 130 may detect a change in state (or status) of the first heating unit 110, due to an object placed on the first heating unit 110, to determine the presence and absence of the second cooking appliance 200 based on a result of the detection.

Here, the change in state may refer to a change in electrical state (or status) of the first heating unit 110 caused by the second cooking appliance 200.

It may be, for example, a current flowing in the first heating unit 110, generation of power in the first heating unit 110, or generation of electromagnetic waves in the first heating unit 110, caused by the presence of the second cooking appliance 200.

The first control unit 130 may detect a current induced in the first heating unit 110 by an object placed on the first heating unit 110 to determine the presence and absence of the second cooking appliance 200 according to a result of the detection.

For example, when the result of the detection corresponds to a specific current value, it may be determined that the second cooking appliance 200 is disposed on the first heating unit 110.

The first control unit 130 may also detect power consumed in the first heating unit 110 due to an object placed on the first heating unit 110 to determine the presence and absence of the second cooking appliance 200 according to a result of the detection.

For example, when the result of the detection corresponds to a specific power value or exceeds a preset power variation reference, it may be determined that the second cooking appliance 200 is disposed on the first heating unit 110.

The first control unit 130 may also detect an electromagnetic wave generated in the first heating unit 110 due to an object disposed on the first heating unit 110 to determine the presence and absence of the second cooking appliance 200 according to a result of the detection.

For example, when the result of the detection corresponds to a specific frequency value, it may be determined that the second cooking appliance 200 is disposed on the first heating unit 110.

The first control unit 130 may control such that the heating operation is performed, or power is supplied to the second cooking appliance 200 according to a result of the determination.

For example, when it is determined that the heating object is placed on the first heating unit 110, the first control unit 130 controls such that the first heating unit 110 performs the heating operation, and when it is determined that the second cooking appliance 200 is disposed on the first heating unit 110, the first control unit 130 may control such that power flows in the second cooking appliance 200.

When the first cooking appliance 100 is controlled to perform heating operation as a heating object is disposed on the first heating unit 110, the first control unit 130 may control such that the first power unit 120 supplies the driving power to the first heating unit 110, and the first heating unit generates the magnetic lines of force based on the driving power and emits the magnetic lines of force to the heating object.

When the second cooking appliance 200 is disposed on the first heating unit 110, the first control unit 130 may determine a charging status or level of the battery 221 and control the first heating unit 110 and the first power unit 120 so that power is supplied to the second cooking appliance 200 according to a result of the determination.

When the second cooking appliance 200 is disposed on the first heating unit 110 and is in ready for operation (or standby), the first control unit 130 may determine a charging level of the battery 221 and control the first heating unit 110 and the first power unit 120 so that power is supplied to the second cooking appliance 200 according to a result of the determination.

That is, when the second cooking appliance 200 is disposed on the first heating unit 110 and is in ready for operation, the first control unit 130 may control the first heating unit 110 and the first power unit 120 so that power is supplied to the second cooking appliance 200 according to a charging level of the battery 221.

For example, when a charging level of the battery 221 is 100 [%], the first heating unit 110 and the first power unit 120 are controlled such that power does not flow in the second cooking appliance 200. When a charging level of the battery 221 is less than a specific reference, the first heating unit 110 and the first power unit 120 may be controlled such that power flows in the second cooking appliance 200 until the battery 221 is charged to the specific reference.

When the first heating unit 110 heats a heating object in a state that the second cooking appliance 200 is disposed thereon, the first control unit 130 may control such that the first power unit 120 supplies the driving power to the first heating unit 110, and the first heating unit 110 generates first magnetic lines of force based on the driving power and radiates the first magnetic lines of force to the second cooking appliance 200.

That is, when the first cooking appliance 100 heats a heating object while the second cooking appliance 200 is disposed on the first heating unit 110, the first cooking appliance 100 may be operated to emit the first magnetic lines of force, allowing power to flow in the second cooking appliance 200.

Here, the first magnetic lines of force are magnetic lines of force that are emitted to the second cooking appliance 200, which may be generated separately in addition to magnetic lines of force for the first cooking appliance 100 to heat the heating object.

The first heating unit 110 may heat a heating object by receiving the first magnetic lines of force in a state that the second cooking appliance 200 is disposed thereon, as illustrated in FIG. 8 or FIG. 9.

The first cooking appliance 100 and the second cooking appliance 200 may operate in a separate manner as illustrated in FIG. 8A, or the second cooking appliance 200 may be disposed on the first heating unit 110 as illustrated in FIG. 8B.

When second cooking appliance 200 heats a heating object while being disposed on the first heating unit 110, the first heating unit 110 may emit the first magnetic lines of force such that the first magnetic lines of force are emitted to an upper part of the second cooking appliance 200 as illustrated in FIG. 8B.

That is, as the first cooking appliance 100 emits the first magnetic lines of force to the upper part of the second cooking appliance 200 as illustrated in FIG. 8B, the second cooking appliance 200 may be operated to heat the heating object by the first magnetic lines of force emitted to the upper part thereof.

Here, the second cooking appliance 200 may heat the heating object by amplifying the first magnetic lines of force to convert them into second magnetic lines of force and emitting the second magnetic lines of force.

That is, the second cooking appliance 200 may heat the heating object by amplifying the first magnetic lines of force emitted from the first heating unit 110 to convert them into the second magnetic lines of force and emitting the second magnetic lines of force.

When the heating object is heated as described above, the second cooking appliance 200 may be operated as a relay that amplifies the first magnetic lines of force emitted from the first heating unit 110 to convert them into the second magnetic lines of force, and emits the second magnetic lines of force which are the amplified first magnetic lines of force.

The second cooking appliance 200 may convert power induced by the first magnetic lines of force into charging power to be stored in the battery 221.

The second cooking appliance 200 may covert power induced in a lower part of the second cooking appliance 200 by the first magnetic lines of force into charging power and store the charging power in the battery 221.

That is, when the second cooking appliance 200 amplifies and emits the first magnetic lines of force emitted from the first heating unit 110, the second cooking appliance 200 may convert power induced in the lower part of the second cooking appliance 200 into the charging power to store it in the battery 221, and perform the heating operation by amplifying magnetic lines of force that have reached the upper part of the second cooking appliance 200 to the second magnetic lines of force and emitting the second magnetic lines of force to thereby perform one or more of charging the battery 221 and the heating operation.

Figure 9A:
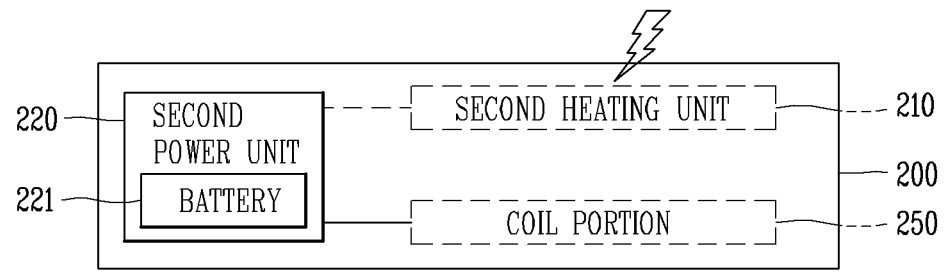
FIG. 9A illustrates an operation example 4a of cooking appliances according to an embodiment of the present disclosure.
Figure 9B:
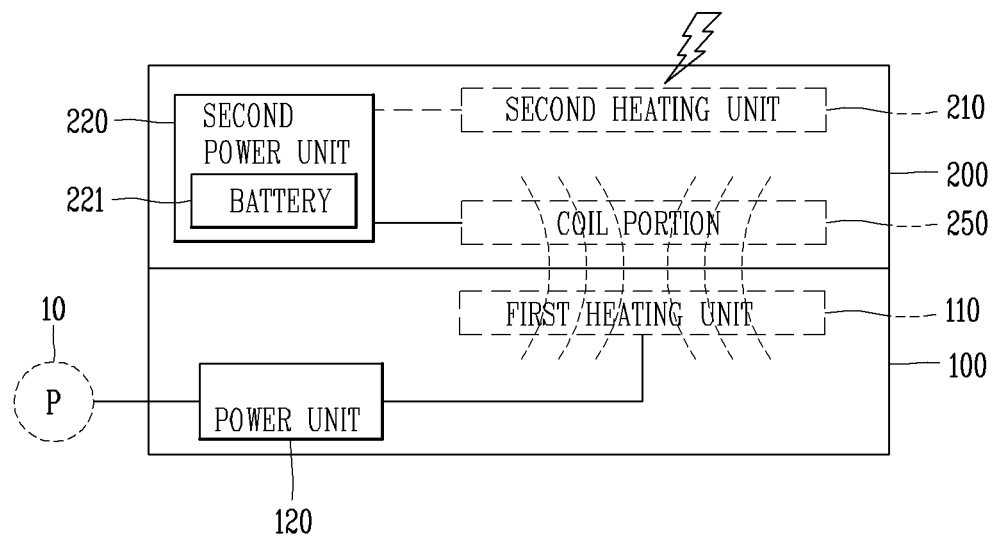
FIG. 9B illustrates an operation example 4b of cooking appliances according to an embodiment of the present disclosure.

The first cooking appliance 100 and the second cooking appliance 200 may be operated in a separate manner as illustrated in FIG. 9A, or the second cooking appliance 200 may be disposed on the first heating unit 110 as illustrated in FIG. 9B.

When the second cooking appliance 200 heats a heating object while being disposed on the first heating unit 110, the first heating unit 110 may emit the first magnetic lines of force so that power is induced in the second cooking appliance 200 by the first magnetic lines of force as illustrated in FIG. 9B.

That is, as illustrated in FIG. 9B, the first cooking appliance 100 may emit the first magnetic lines of force so that power is induced in the second cooking appliance 200 by the first magnetic lines of force emitted from the first heating unit 110, allowing the second cooking appliance 200 to heat the heating object by the induced power.

Here, the second cooking appliance 200 may heat the heating object by generating third magnetic lines of force using power induced by the first magnetic lines of force and emitting the third magnetic lines of force.

That is, the second cooking appliance 200 may generate and emit the third magnetic lines of force by the induced power to heat the heating object.

When the heating object is heated as described above, the second cooking appliance 200 generates the third magnetic lines of force based on power induced by the first magnetic lines of force emitted from the first heating unit 110 and emits the generated third magnetic lines of force, thereby enabling wireless power transmission between the first cooking appliance 100 and the second cooking appliance 200.

The second cooking appliance 200 may convert power induced by the first magnetic lines of force into charging power to be stored in the battery 221.

The second cooking appliance 200 may convert power, induced in the lower part of the second cooking appliance 200 by the first magnetic lines of force emitted from an upper part of the first heating unit 110, into charging power and store the charging power in the battery 221.

That is, when the second cooking appliance 200 generates and emits the third magnetic lines of force based on power induced by the first magnetic lines of force emitted from the first heating unit 110, the second cooking appliance 200 may covert some (or part) of the power, induced in the lower part of the second cooking appliance 200 by the first magnetic lines of force emitted from the first heating unit 110, into the charging power to be stored in the battery 221, and convert the rest of the power into the driving power to generate the third magnetic lines of force and emit the generated third magnetic lines of force to perform the heating operation, allowing the second cooking appliance 200 to perform one or more of the charging the battery 221 and the heating operation.

As the first cooking appliance 100 is operated in this manner when the second cooking appliance 200 is disposed on the first heating unit 110, power flows in the second cooking appliance 200, allowing the second cooking appliance 200 to perform the heating operation.

Hereinafter, an embodiment of the second cooking appliance 200 in which power flows when disposed on the first heating unit 110 will be described.

Second Cooking Appliance—Second Embodiment

Hereinafter, a second cooking appliance (or cooker) according to the present disclosure, namely a second embodiment will be described.

The [second cooking appliance] according to the present disclosure may be implemented as a part of configurations or steps included in the following embodiments or a combination thereof, or implemented as a combination of embodiments. Technical terms used in this specification are used to merely illustrate specific embodiments, and therefore it should be understood that they are not intended to limit the present disclosure.

The second cooking appliance refers to a cooking appliance that heats a heating object by an induction heating method like the first cooking appliance 100.

The second cooking appliance may be formed as a single module.

The second cooking appliance may be a cooking appliance that is included in a cooking appliance having a plurality of cooking modules.

That is, the second cooking appliance may be included in another cooking appliance or may be combined with another cooking appliance.

For example, it may be combined with the first cooking appliance 100 which is a fixed cooking module.

Hereinafter, for the sake of convenience, the second cooking appliance will be referred to as "second cooking appliance" to distinguish it from the first cooking appliance 100 (first embodiment) to which the second cooking appliance is coupled, and a cooking appliance (third embodiment) that includes the first cooking appliance and the second cooking appliance.

The second cooking appliance may be a detachable cooking module.

The second cooking appliance may be the second cooking appliance described in association with the first cooking appliance 100.

That is, it may be a second cooking appliance disposed on the first cooking appliance 100.

In addition, the second cooking appliance may be a cooking module coupled to a fixed cooking module.

As illustrated in FIG. 3, the second cooking appliance 200 includes a second heating unit 210 that generates and radiates or emits magnetic lines of force, and a second power unit 220 provided with a battery 221 to covert power charged in the battery 221 into driving power for the second heating unit 220 and supply the driving power to the second heating unit 210, and a second control unit (or controller) 230 that controls heating operation of the second cooking appliance 200 by controlling operation (or driving) of the second heating unit 210 and power supply of the second power unit 220.

The second cooking appliance 200 may be a detachable cooking appliance.

The second cooking appliance 200 may be a detachable cooking module coupled to a cooking appliance that includes a plurality of cooking modules.

The second cooking appliance 200 may be a portable cooking module coupled to a fixed cooking module that is provided as a built-in feature (type).

The second cooking appliance 200 may be coupled to a fixed cooking module.

The second cooking appliance 200 may be disposed on the first cooking appliance 100 as illustrated in FIG. 2.

When the second cooking appliance 200 is disposed on the first cooking appliance 100 operated by power supplied from the power supply source 10 in FIG. 2, the second control unit 230 controls the second heating unit 210 and the second power unit 220 so that the heating operation is performed by using the power of the first cooking appliance 100.

More specifically, the second control unit 230 controls the second heating unit 210 and the second power unit 220 so that the heating operation is performed by power flowing in the second cooking appliance 200 as the first cooking appliance 100 is operated.

That is, when the second cooking appliance 200 is disposed on the first heating unit 110 as illustrated in FIG. 4A or FIG. 4B, power may flow in the second cooking appliance 200 as the first cooking appliance 200 is operated.

When the second cooking appliance 200 is separated from the first cooking appliance 100, the second cooking appliance 200 may be operated by power charged in the battery 221.

When the second cooking appliance 200 is separated from the first cooking appliance 100, the second power unit 220 may convert power charged in the battery 221 into the driving power to be supplied to the second heating unit 210, and the second heating unit 210 may generate the magnetic lines of force based on the driving power to emit the magnetic lines of force to an upper part of the second heating unit 220.

When the second cooking appliance 200 is disposed on the first cooking appliance 100, the second cooking appliance 200 may be operated by power of the first cooking appliance 100.

In detail, when the second cooking appliance 200 is disposed on the first cooking appliance 100, the first cooking appliance 100 may be operated by power, and thus the second cooking appliance 200 may be operated by power flowing into the second cooking appliance 200 as the first cooking appliance 100 is operated.

Here, the second cooking appliance 200 may be disposed on the first cooking appliance 100, that is the second cooking appliance 200 may be disposed to be stacked on the first heating unit 100.

That is, the second cooking appliance 200 may be disposed on the first heating unit 110 in a stacked manner.

The second cooking appliance 200 may, preferably, have the same dimension as the first cooking appliance 100 so as to be disposed on the first heating unit 110 in a stacked manner.

The second heating unit 210 may be may be a cooking zone of the second cooking appliance 200.

The second heating unit 210, which is provided on an upper surface of the second cooking appliance 200, may be a cooking zone that heats a heating object placed on the upper surface of the first cooking appliance 100.

The second heating unit 210 may be a cooking zone that heats the heating object by an induction heating method.

The second heating unit 210 may heat the heating object by emitting the magnetic lines of force, which is a heat source of induction heating, to the heating object.

The second heating unit 210 may include a coil that generates and emits the magnetic lines of force.

The second heating unit 210 may generate the magnetic lines of force based on the driving power and emit the magnetic lines of force to an upper part of the second heating unit 210.

When the driving power is applied to the coil, magnetic lines of force (magnetic field) is generated in the coil by the driving power. Then, the second heating unit 210 may emit the generated magnetic lines of force to an upper part of the second cooking appliance 200, allowing the heating object placed thereon to be heated.

The second heating unit 210 may be controlled by the second control unit 230.

The second heating unit 210 may be a power element of the second cooking appliance 200.

The second power unit 220 may include the battery 221 to control charging and discharging of the battery 221.

The second power unit 220 may convert power charged in the battery 221 into the driving power and supply it to the second heating unit 210.

That is, the second cooking appliance 200 may be operated by power charged in the battery 221.

Here, the second cooking appliance 200 may be operated by power charged in the battery 221 when the second cooking appliance 200 is operated by being separated from the first cooking appliance 100, or when the The second power unit 220 may be connected to the second heating unit 210, so as to supply the driving power to the second heating unit 210.

The second power unit 220 may be connected to the battery 221 and the second heating unit 210, so as to convert power charged in the battery 221 into the driving power and apply the driving power to the coil of the second heating unit 210.

The second power unit 220 may apply the driving power to the coil of the second heating unit 210 so that the magnetic lines of force are generated in the coil by the driving power.

The first power supply 220 may be controlled by the second control unit 230.

The first control unit 230 may be a control element of the second cooking appliance 200.

The second control unit 230 controls operation (driving) of the second heating unit 210 and power supply of the second power unit 220, so as to control the heating operation of the second cooking appliance of 200, which is performed by the second heating unit 210

The second control unit 230 may control operation of the second heating unit 210 and power supply of the second power unit 220 according to an operating state (or status) of the second cooking appliance 200.

When the second cooking appliance 200 is not disposed on the first heating unit 110, the second control unit 230 may control operation of the second heating unit 210 and power supply of the second power unit 220 so that the heating operation is performed by the second heating unit 210.

That is, when the second cooking appliance 200 is separated from the first cooking appliance 100, the second heating unit 210 may heat the heating object using power charged in the battery 221.

When the second cooking appliance 200 is disposed on the first heating unit 110, the second control unit 230 may control operation of the second heating unit 210 and power supply of the second power unit 220 so that the heating operation is performed by the second heating unit 210.

That is, when the second cooking appliance 200 is disposed on the first cooking appliance 100, the second heating unit 210 may heat the heating object based on power flowing in the second cooking appliance 200 as the first cooking appliance 100 is operated.

Accordingly, when the second cooking appliance 200 is disposed on the first heating unit 110, that is, when the second cooking appliance 200 is coupled to the first cooking appliance 100 as illustrated in FIG. 5A, the second heating unit 210 may perform the heating operation based on power flowing in the second cooking appliance 200 as the first cooking appliance 100 is operated. When the second cooking appliance 200 is separated from the first cooking appliance 100 as illustrated in FIG. 5B, the second heating unit 210 may perform the heating operation using power charged in the battery 221.

When the second cooking appliance 200 is disposed on the first cooking appliance 100, the second cooking appliance 200 may be in contact with the contact portion 140 formed on one side of the first cooking appliance 100, so as to be electrically connected to the first cooking appliance 100 through the contact portion 140.

When the second cooking appliance 200 is disposed on the first cooking appliance 100, the second cooking appliance 200 may be brought into contact with the contact 141 provided at one point of the upper part of the first cooking appliance 100, so as to be electrically connected to the first cooking appliance 100 through the contact 141.

Here, the second cooking appliance 200 may include a connection portion 240 connected to the contact 141, so as to be connected to the contact 141 through the connection portion 240.

The connection portion 240 may be connected to the second power unit 220, so as to electrically connect the second power unit 220 and the first cooking appliance 100.

The contact 141 may be connected to at least one of the power supply source 10 and the first power unit 120 of the first cooking appliance 100.

Accordingly, the second power unit 220 may receive power from the at least one of the power supply source 10 and the first power unit 120 through the connection portion 240 and the contact 141.

Here, the second control unit 230 may control one or more of charging of the battery 221 and operation of the second heating unit 210 based on power supplied through the contact 141.

For example, when the second cooking appliance 200 does not perform the heating operation, the second control unit 230 may control such that power supplied through the contact 141 is charged in the battery 221. When the second cooking appliance 200 performs the heating operation, the second control unit 230 may control such that power is converted into the driving power to be supplied to the second heating unit 210, or the driving power is supplied to the second heating unit 210 while charging power supplied through the contact 141 in the battery 221.

The second power unit 220 may sense a charging level (or status) of the battery 221 and convert the supplied power into charging power for charging the battery 221 according to a result of the sensing to thereby store the charging power in the battery 221.

For example, when a charging level of the battery 221 is 100 [%], the battery 221 is not charged, and when a charging level of the battery 221 is less than a specific reference, the supplied power is converted into the charging power to be stored in the battery 221 until the battery 221 is charged to the specific reference.

The second power unit 220 may sense an operating state (or status) of the second heating unit 210 and convert the supplied power into the driving power according to a result of the sensing, so as to supply the driving power to the second heating unit 210.

For example, the driving power may be supplied to the second heating unit 210 in proportion to a target emission amount of magnetic lines of force emitted from the second heating unit 210.

When a heating object is placed on the second heating unit 210 in a state that the second cooking appliance 200 is disposed on the first cooking appliance 100, the second control unit 230 may control the second heating unit 210 and the second power unit 220 so that the second cooking appliance 200 heats the heating based on first magnetic lines of force emitted from the first cooking appliance 100.

That is, when the second cooking appliance 200 heats a heating object while being disposed on the first heating unit 110, the second cooking appliance 200 may perform the heating operation based on the first magnetic lines of force emitted from the first heating unit 110.

The second cooking appliance 200 may heat a heating object while being disposed on the first heating unit 110 as illustrated in FIG. 8 or FIG. 9.

The first cooking appliance 100 and the second cooking appliance 200 may operate in a separate manner as illustrated in FIG. 8A, or the second cooking appliance 200 may be disposed on the first heating unit 110 as illustrated in FIG. 8B.

When the second cooking appliance 200 performs the heating operation as a heating object is placed on the second heating unit 210 while being disposed on the first cooking appliance 100, the second heating unit 210 may amplify and emit the first magnetic lines of force emitted from the first cooking appliance 100, as illustrated in FIG. 8B, so as to heat the heating object.

That is, as illustrated in FIG. 8B, the second heating unit 210 may receive the first magnetic lines of force emitted from the first heating unit 110, amplify the received first magnetic lines of force to convert them into second magnetic lines of force, and emit the second magnetic lines of force to the upper part of the second heating unit 210, allowing the second cooking appliance 200 to heat the heating object.

Here, the first heating unit 110 may emit the first magnetic lines of force with a magnitude (or size) of the first magnetic lines of force to be emitted to the upper part of the second heating unit 210 as illustrated in FIG. 8B.

That is, the second heating unit 210 may serve as a relay that amplifies the first magnetic lines of force emitted from the first heating unit 110 to convert them into the second magnetic lines force and emits the second magnetic lines of force, so as to allow the heating operation to be performed.

The second power unit 220 may convert the power, induced by the first magnetic lines of force received by the second heating unit 210, into charging power for charging the battery 221 to be stored in the battery 221.

The second power unit 220 may convert power, induced in a lower part of the second cooking appliance 200 by the first magnetic lines of force emitted from the upper part of the first heating unit 110, into charging power and store the charging power in the battery 221.

The second power unit 220 may convert power, induced in a power line between the second power unit 220 and the battery 221 by the first magnetic lines of force emitted from the upper part of the first heating unit 110, into charging power for charging the battery 221 to be stored in the battery 221.

That is, when the second cooking appliance 200 amplifies the first magnetic lines of force emitted from the first heating unit 110 to the second magnetic lines of force and emits the second magnetic lines of force, the second cooking appliance 200 may store the charging power in the battery 221 by converting power induced in the second cooking appliance 200 into the charging power, and perform the heating operation by amplifying the first magnetic lines of force received by the second heating unit 210 to the second magnetic lines of force and emitting the second magnetic lines of force to thereby perform one or more of charging the battery 221 and the heating operation.

The first cooking appliance 100 and the second cooking appliance 200 may be operated in a separate manner as illustrated in FIG. 9A, or the second cooking appliance 200 may be disposed on the first heating unit 110 as illustrated in FIG. 9B.

When the second cooking appliance 200 heats a heating object placed on the second heating unit 210 while being disposed on the first cooking appliance 100, the second cooking appliance 200 may heat the heating object as the power unit 220 provided with a coil portion 250 in which power is induced by receiving the first magnetic lines of force emitted from the first cooking appliance 100 coverts the power induced in the coil portion 250 into the driving power so as to supply the converted driving power to the second heating unit 200, as illustrated in FIG. 9B, and the second heating unit 210 generates third magnetic lines of force based on the driving power and emits the third magnetic lines of force to the heating object.

That is, as illustrated in FIG. 9B, as the coil portion 250 receives the first magnetic lines of force emitted from the first heating unit 110, the second power unit 220 converts power induced in the coil portion 250 by the magnetic lines of force into the driving power and supplies it to the second heating unit 210, then the second heating unit 210 generates the third magnetic lines of force using the driving power and emits the third magnetic lines of force upwards, the second cooking appliance 200 may heat the heating object.

Here, as illustrated in FIG. 9B, the first heating unit 110 may emit the first magnetic lines of force with a magnitude (or size) of power induced in the coil portion 250 by the first magnetic lines of force emitted thereto.

That is, the coil portion 250 may serve as a receiving unit (or receiver) of wireless power transmission that receives the first magnetic lines of force radiated from the first heating unit 110 and converts the received first magnetic lines of force into induced power.

The second power unit 220 may convert the induced power by the first magnetic lines of force received in the coil portion 250 into charging power for charging the battery 221 to be stored in the battery 221.

That is, when the second cooking appliance 200 is operated by power induced by the first magnetic lines of force emitted from the first heating unit 110, the second cooking appliance 200 may charge the battery 221 by converting the power induced in the coil portion 250 by the first magnetic lines of force emitted from the first heating unit 110 into the charging power and supplying the charging power in the battery 221, and perform the heating operation by converting the power induced in the coil portion 250 into the driving power and supplying the driving power to the second heating unit 210 to thereby perform one or more of charging the battery 221 and the heating operation.

Here, the second power unit 220 may control conversion of the induced power according to one of a charging level of the battery 221 and a state of performing the heating operation.

The second power unit 220 may perform at least one of charging the battery 221 and supplying power to the second heating unit 210 by converting the induced power into at least one of the charging power and the driving power according to the one of the charging level of the battery 221 and the state of performing the heating operation.

The second power unit 220 may convert some (or part) of the induced power into the driving power according to a preset conversion ratio and transfer the converted power to the second heating unit 210, and convert the remaining power into the charging power to be stored in the battery 221.

For example, when the charging power is 30 [%] and the driving power is set to 70 [%], 30 [%] of the induced power may be converted into the charging power to store it in the battery 221, and the remaining 70 [%] of the induced power may be converted into the driving power to supply it to the second heating unit 210.

As the second cooking appliance 200 is operated in this manner when disposed on the first heating unit 110, the heating operation may be performed by the second cooking appliance 200 based on power flowing therein as the first cooking appliance 100 is operated.

Hereinafter, an embodiment of a cooking appliance 500 that includes the first cooking appliance 100 and the second cooking appliance 200, namely, a third embodiment will be described.

Cooking Appliance—Third Embodiment

Hereinafter, a third embodiment of the cooking appliance (or cooker) according to the present disclosure will be described.

The [cooking appliance] according to the present disclosure may be implemented as a part of configurations or steps included in the following embodiments or a combination thereof, or implemented as a combination of embodiments. Technical terms used in this specification are used to merely illustrate specific embodiments, and therefore it should be understood that they are not intended to limit the present disclosure.

The first cooking appliance refers to a cooking appliance that heats heating object by an induction heating method, like the first cooking appliance 100 and the second cooking appliance 200 described above.

The cooking appliance may be a cooking appliance that includes a plurality of cooking modules.

That is, the cooking appliance may be a cooking appliance to which a plurality of cooking modules is coupled.

For example, the first cooking appliance 100 which is a fixed cooking module and the second cooking appliance 200 which is a detachable cooking module may be coupled thereto.

As illustrated in FIGS. 5A and 5B, the cooking appliance includes a first cooking module 100 operated by power received from a power supply source 10 and a second cooking module 200 disposed on the first cooking module 100 or operated by being separated from the first cooking module 100.

In the cooking appliance, when the second cooking module 200 is disposed on the first cooking module 100 as illustrated in FIG. 5A, the second cooking module 200 is operated by power flowing therein as the first cooking module 100 is operated, and when the second cooking module 200 is detached from the first cooking module 100, the second cooking module 200 is operated by power charged in a built-in battery 221.

That is, in the cooking appliance, the second cooking module 200 is operated in a state that the first cooking module 100 and the second cooking module 200 are coupled to each other as illustrated in FIG. 5A, or the first cooking module 100 and the second cooking module 200 may be operated individually, by being separated from each other as illustrated in FIG. 5B.

Accordingly, when the first cooking module 100 and the second cooking module 200 are coupled to each other as illustrated in FIG. 5A, the first cooking module 100 may disable its heating operation, and enable heating operation of the second cooking module 200.

In addition, when the first cooking module 100 and the second cooking module 200 are separated from each other as illustrated in FIG. 5B, the first cooking module 100 may be operated by power supplied from the power supply source 10 so as to perform heating operation, and the second cooking module 200 may be operated by power stored in the battery 221 to thereby perform heating operation.

The first cooking module 100 may be the first cooking appliance 100 described above.

As illustrated in FIG. 2, the first cooking module 100 may include a first heating unit 110 that generates and emits magnetic lines of force for induction heating and a first power unit 120 that converts power supplied from the power supply source 10 into driving power and supplies the driving power to the first heating unit 110.

The second cooking module 200 may be the second cooking appliance 100 described above.

As illustrated in FIG. 3, the second cooking module 200 may include the battery 221 in which power is stored, a second heating unit 210 that generates and radiates magnetic lines of force for induction heating, and a second power unit 220 that controls charging and discharging of the battery 221 and supplies driving power to the second heating unit 210.

When the second cooking module 200 is disposed on the first cooking module 100, the second power unit 220 may perform at least one of charging the battery 221 and supplying power to the second heating unit 210 based on power flowing as the first cooking module 100 is operated. When the second cooking module 200 is separated from the first cooking module 100, the second power unit 220 may convert power charged in the battery 221 into the driving power and supply the driving power to the second heating unit 210.

The first cooking module 100 may further include a contact portion 140 formed on one side of the first heating unit 110 to be in contact with the second cooking module 200.

As illustrated in FIGS. 6A, 6B, 7A, and 7B, the contact portion 140 may be provided at one side of the first heating unit 110 to protrude in its height direction, so as to be in contact with the second cooking module 200.

Figure 7B:
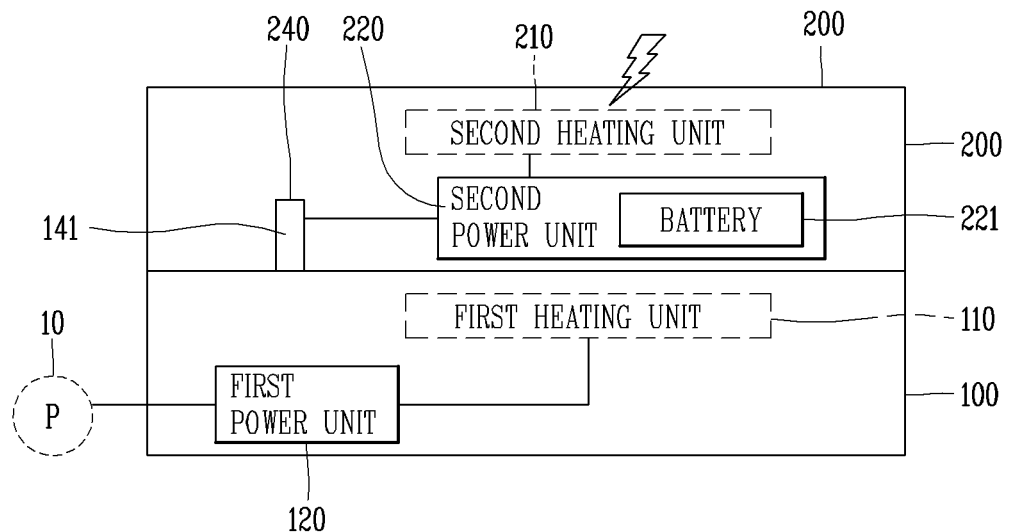
FIG. 7B illustrates an operation example 2b of cooking appliances according to an embodiment of the present disclosure.

When the contact portion 140 is provided at one side of the first heating unit 110 to protrude in its height direction as illustrated in FIGS. 6A and 7A, the contact portion 140 may support the second cooking module 200 disposed on the first heating unit 110 as illustrated in FIGS. 6B and 7B.

That is, the contact portion 140 may support the second heating module 200 that is in contact therewith as the second heating module 200 is disposed on the first heating unit 110.

The first cooking module 100 may further include a contact 141 that is in contact with the second cooking module 200 to be electrically connected thereto, as illustrated in FIGS. 6A, 6B, 7A and 7B.

The contact 141 may be a terminal that protrudes from the contact portion 140 in a direction to be in contact with the second cooking module 200.

At least one contact 141 may be provided in a direction to be in contact with the second cooking module 200 from the contact portion 140.

The second cooking module 200 may further include a connection portion 240 that is brought into contact with the contact 141 provided on the first cooking module 100 to be electrically connected to the first cooking module 100 through the contact 141.

When the second cooking module 200 is disposed on the first cooking module 100, the second cooking module 200 may receive power from the first cooking module 100 through the the connection portion 240 as the connection portion 240 is brought into contact with the contact 141.

Here, the first cooking module 100 may sense the contact 141 that is in contact with the connection portion 240 to detect the presence and absence of the second cooking module 200.

That is, the contact 141 may be a sensing element that senses the second cooking module 200 disposed on the first heating unit 110.

The contact 141 may be connected to at least one of the power supply source 10 and the first power unit 120, so as to provide electrical connection between the second cooking module 200 and the at least of the power supply source 10 and the first power unit 120.

That is, the second cooking module 200 may be electrically connected to the at least one of the power supply source 10 and the first power unit 120 through the contact 141.

When the contact 141 is brought into contact with the second cooking module 200, the contact 141 may electrically connect the second cooking module 200 and the at least one of the power supply source 10 and the first power unit 120 so that power is supplied to the second cooking module 200 from the at least one of the power supply source 10 and the first power unit 120.

That is, when the second cooking module 200 is disposed on the first heating unit 110, the second cooking module 200 may receive power from the at least one of the power supply source 10 and the first power unit 120 through the connection portion 240 that is in contact with the contact 141.

Here, the second power unit 220 may perform one or more of charging the battery 221 and supplying driving power to the second heating unit 210 based on power supplied through the connection portion 240.

The second power unit 220 may perform one or more of charging the battery 221 and supplying driving power to the second heating unit 210 according to whether the heating operation is performed by the second heating unit 210.

For example, when the second heating unit 210 does not perform the heating operation, power supplied through the contact 141 may be controlled to be charged in the battery 221, and when the second heating unit 210 performs the heating operation, power supplied through the contact 141 may be controlled to be converted into the driving power to be supplied to the second heating unit 210, or the driving power may be controlled to be supplied to the second heating unit 210 while charging power supplied through the contact 141 in the battery 221.

When the first and second cooking modules 100 and 200, operated in a separate manner as illustrated in FIG. 8A, operate in a combined manner as illustrated in FIG. 8B, that is, when the second cooking module 200 performs heating operation while being disposed on the first cooking module 100, the second heating unit 210 may receive first magnetic lines of force emitted from the first cooking module 100, amplify the received first magnetic lines of force to convert them into second magnetic lines of force, then emit the second magnetic lines of force.

That is, when the second cooking module 200 performs heating operation while being disposed on the first cooking module 100, the second heating unit 210 may receive the first magnetic lines of force emitted from the first heating unit 110, amplify the first magnetic lines of force to convert them into the second magnetic lines of force, and emit the second magnetic lines of force to a heating object placed on the second heating unit 210, allowing the second cooking module 200 to heat the heating object.

In this case, the second cooking module 200 may serve as a relay that amplifies and emits the first magnetic lines of force radiated from the first heating unit 110.

In addition, the first heating unit 110 may emit the first magnetic lines of force with a magnitude (or size) to be emitted to the upper part of the second heating unit 210 as illustrated in FIG. 8B When the second heating unit 210 operated as the relay performs the heating operation, the second power unit 220 may charge the battery 221 based on power induced by the first magnetic lines of force received in the second heating unit 210.

The second power unit 220 may convert power, induced by the first magnetic lines of force received in the second heating unit 210, into charging power for charging the battery 221 and store the charging power in the battery 221.

The second power unit 220 may convert power, induced in a lower part of the second cooking module 200 by the first magnetic lines of force emitted from an upper part of the first heating unit 110, into charging power and store the charging power in the battery 221.

The second power unit 220 may convert power, induced in a power line between the second power unit 220 and the battery 221 by the first magnetic lines of force emitted from the upper part of the first heating unit 110, into charging power for charging the battery 221 be stored in the battery 221.

When the first and second cooking modules 100 and 200, operated in a separate manner as illustrated in FIG. 9A, operate in a combined manner as illustrated in FIG. 9B, that is, when the second cooking module 200 performs heating operation while being disposed on the first cooking module 100, the second cooking module 200 may further include a coil portion 250 that receives the first magnetic lines of force emitted from the first cooking module 100.

When the second cooking module 200 that further includes the coil portion 250 performs heating operation while being disposed on the first cooking module 100, the coil portion 250 may receive the first magnetic lines of force emitted from the cooking module 100, causing power to be induced by the received first magnetic lines of force.

Here, the power induced in the coil portion 250 may be converted into the driving power to be supplied to the second heating unit 210, and the second heating unit 210 may generate and emit third magnetic lines of force using the driving power to thereby heat the heating object.

That is, when the second cooking module 200 performs heating operation while being disposed on the first cooking module 100, the second cooking module 200 may heat the heating object as the coil portion 250 receives the first magnetic lines of force emitted from the first heating unit 110 so that power is induced therein by the received first magnetic lines of force, the second power unit 200 converts the induced power into the driving power to supply it to the second heating unit 210, and the heating unit 210 generates the third magnetic lines of force based on the driving power so as to allow the third magnetic lines of force to be emitted to the heating object placed on the second heating unit 210.

The coil portion 250 may serve as a receiving unit (or receiver) of wireless power transmission that receives the first magnetic lines of force radiated from the first heating unit 110 and converts the received first magnetic lines of force into induced power.

In this case, as illustrated in FIG. 9B, the first heating unit 110 may emit the first magnetic lines of force with a magnitude (or size) of power induced in the coil portion 250 by the first magnetic lines of force emitted thereto.

The coil portion 250 may be provided at a lower portion of the second heating unit 210.

The coil portion 250 may be provided at the lower portion of the second heating unit 210 to receive magnetic lines of force emitted from the first heating unit 110.

The second power unit 220 may perform at least one of charging the battery 221 and supplying driving power to the second heating unit 210 based on power induced in the coil portion 250.

The second power unit 220 may convert power, induced by the first magnetic lines of force received by the coil portion 250, into charging power for charging the battery 221 and store the charging power in the battery 221.

The second power unit 220 may convert the induced power into the at least one of the charging power and the driving power according to at least one of a charging level of the battery 221 and a state of the performing the heating operation to thereby perform at least one of charging the battery 221 and supplying power to the second heating unit 210.

The second power unit 220 may convert some (or part) of the induced power into the driving power according to a preset conversion ratio and transfer the converted power to the second heating unit 210, and covert the remaining power into charging power for charging the battery and store the charging power in the battery 221.

The cooking appliance operated in this manner may be implemented in various forms including the first and second cooking modules 100 and 200, or may be applied to an operating system of a cooking appliance that includes the first and second cooking modules 100 and 200 or an operating system of a cooking appliance that includes a fixed cooking module and a detachable cooking module.

For example, it may be configured as a cooking appliance 500 that includes a plurality of cooking modules 100 to 300 as illustrated in FIGS. 10A, 10B, 11A, and 11B.

The cooking appliance 500 may be a cooking appliance that includes the first cooking module 100 and the second cooking module 200, and further includes at least one another cooking module 300 as illustrated in FIGS. 10A, 10B, 11A, and 11B.

As illustrated in FIGS. 10A, 10B, 11A and 11B, the cooking appliance 500 may include the fixed cooking module 300 having two cooking zones (or surfaces), the first cooking module 100 that is a fixed cooking module provided at one side of the fixed cooking module 300, and the portable (detachable) second cooking module 200 that is disposed on the first cooking module 100 or operated by being separated from the cooking appliance 500.

Figure 10A:
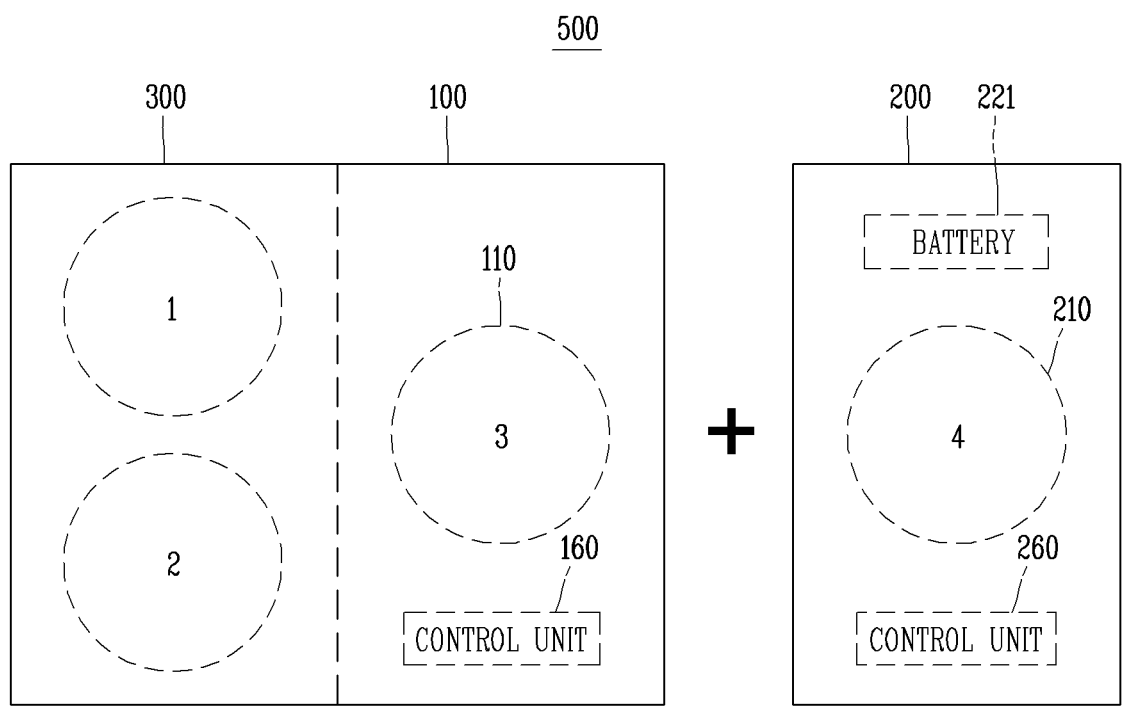
FIGS. 10A and 10B are exemplary views of a cooking appliance including a plurality of cooking modules for illustrating an example of separate use of the cooking modules according to the present disclosure.
Figure 10B:
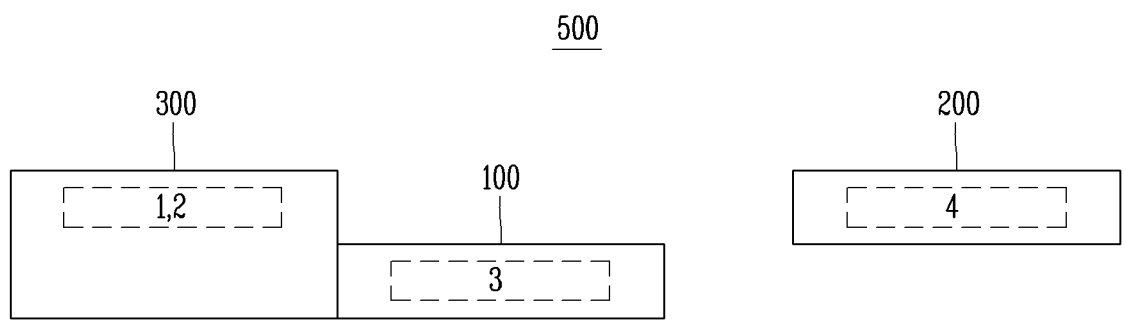

As illustrated in FIGS. 10A and 10B, in the cooking appliance 500, the first cooking module 100 and the second cooking module 200 may be operated individually by being separated from each other.

Here, in the second cooking appliance 500, as the second cooking module 200 is operated by being separated from the first cooking module 100, heating operation may be performed on four cooking zones, namely, two cooking zones of the fixed cooking module 300, one cooking zone of the first cooking module 100, and one cooking zone of the second cooking module 200.

That is, in the cooking appliance 500, as the second cooking module 200 is operated by being separated from the first cooking module 100, more cooking zones may be available for use.

When the second cooking module 200 is operated by being separated from the first cooking module 100, the first and second cooking modules 100 and 200 may include control units 160 and 260, respectively, to which respective manipulation commands for operation of the first and second cooking modules 100 and 200 are input.

The control units 160 and 260 may be input units to which manipulation commands for operation control of the first and second cooking modules 100 and 200 are input, respectively.

Here, when the first and second cooking modules 100 and 200 are operated by being separated from each other, the control unit 160 of the first cooking module 100 may serve as an input unit to which manipulation commands for the first cooking module 100 and the fixed cooking module 300 are input. When the first and second cooking modules 100 and 200 are operated by being separated from each other, the control unit 260 of the second cooking module 200 may serve as an input unit to which a manipulation command for the cooking module 200 is input, and when the first and second cooking modules 100 and 200 are operated by being coupled to each other, the control unit 260 of the second cooking module 200 may serve as an input unit to which manipulation commands for the second cooking module 200 and the fixed cooking module 300 are input.

Figure 11A:
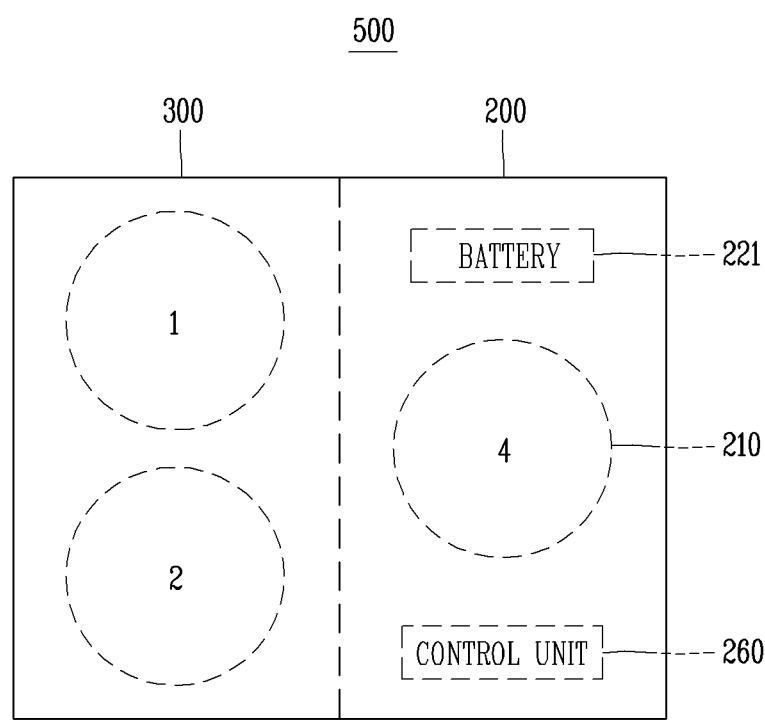
FIGS. 11A and 11B are exemplary views of a cooking appliance including a plurality of cooking modules for illustrating an example of combined use of the cooking modules according to the present disclosure.
Figure 11B:
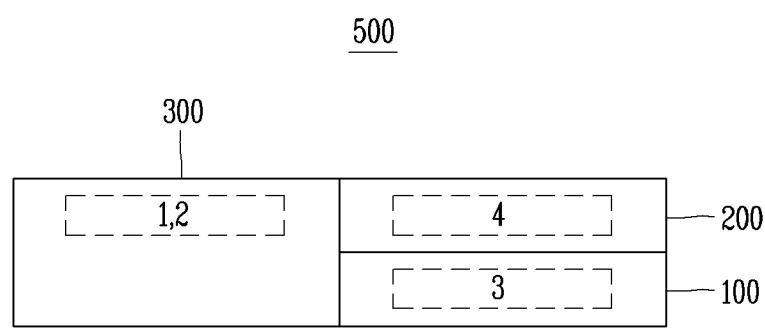

In the cooking appliance 500, the first cooking module 100 and the second cooking module 200 may be operated by being coupled to each other as illustrated in FIGS. 11A and 11B.

Here, in the cooking appliance 500, as the second cooking module 200 is disposed on the first cooking module 100, heating operation may be performed on 3 cooking zones, namely two cooking zones of the fixed cooking module 300, and one cooking zone of the second cooking module 200.

That is, in the cooking appliance 500, three cooking zones may be available for use even in a state in which the first cooking module 100 and the second cooking module 200 are coupled to each other.

Further, in this case, the battery 221 of the second cooking module 200 is charged as the first cooking module 100 is operated, and thus the second cooking module 200 may be operated by power charged in the battery 221.

Therefore, the cooking appliance 500 may allow the number of cooking zones available to be easily increased and maintained, facilitate portability/utility/separate (or individual) operation of a detachable cooking module, and enable charging of the detachable cooking module in an easier manner.

The overall operation processes of the cooking appliance 500 operated in this manner when the first cooking module 100 and the second cooking module 200 are operated by being separated from each other or coupled to each other are illustrated in FIG. 12.

First, in the cooking appliance 500, the first cooking module 100, which is a fixed cooking module, may sense an object placed on the first heating unit 110 (P1), determine whether the object placed on the first heating unit 110 is a heating object or the second cooking module 200 (P2), and perform operations (P3 or P5) according to a result of the determination. For example, heating operation for the heating object (P3) may be performed, or operations (P5 to P12) may be performed such that power flows in the second cooking module 200.

When the object placed on the first heating unit 110 is determined as the heating object (P2) after sensing and determining the object placed on the heating unit 110 (P1 and P2), the first cooking module 100 may determine whether to perform the heating operation (P3) to perform the heating operation (P4), or wait (repeat P1 to P3) until the heating operation is performed according to a result of the determination. When the heating operation is performed (P4), the first cooking module 100 may convert power supplied from the power supply source 10 into the driving power to be supplied to the first heating unit 110, generate the magnetic lines of force for heating the heating object based on the driving power, and emit the magnetic lines of force to the upper part of the first heating unit 110 (P4) to thereby perform the heating operation.

When the object placed on the first heating unit 110 is determined as the second cooking module 200 after sensing and determining the object placed on the heating unit 110 (P1 and P2), the first cooking module 100 may perform operations (P5 to P12) such that power flows in the second cooking module 200 according to whether a heating object is disposed on the second cooking module 200, allowing the second cooking module 200 to perform heating operation, or allowing power to be charged in the battery 221. When the heating object is disposed on the second cooking module 200, the first cooking module 100 may be operated, according to whether heating operation of the second cooking module 200 is performed, to charge the battery (P7), or to perform operations (P8 to P12) such that the heating operation is performed by the second cooking module 200. When the heating operation is not performed by the second cooking module 200, the first cooking module 100 may be operated such that power is charged in the battery 221 (P7) as power is supplied in the second cooking module 200 according to a charging level (or status) of the battery 221. In more detail, when a charging level of the battery 221 does not meet a preset charging reference, the first cooking module 100 may be operated such that power flows in the second cooking module 200, allowing power to be charged in the battery 221. Also, when the heating object is not placed on the second cooking module 200, the first cooking module 100 may be operated such that power flows in the second cooking module 200, allowing power to be charged in the battery 221 (P7). That is, before performing the heating operation by the second cooking module 200 while being disposed on the first cooking module 100, the first cooking module 100 may be operated to allow power to flow in the second cooking module 200 (P7) so that the power is charged in the battery according to a charging level of the battery 221. Here, the first cooking module 100 may be operated such that power flows in the second cooking module 200 (P7) by enabling power transferred from the power supply source 10 to be supplied to the battery 221, or power to be supplied to the second cooking module 200 from the first power unit 120.

When the second cooking module 200 performs the heating operation, the first cooking module 100 may be operated such that power flows in the second cooking module 200, allowing the second cooking module 200 to perform the heating operation (P8 to P12). When the first cooking module 100 is operated to cause power to flow in the second cooking module 200, the first cooking module 100 may be operated such that power is supplied to the second cooking module 200 (P8). Here, the first cooking module 100 may be operated such that power transmitted from the power supply source 10 is supplied to the second cooking module 200, or power is supplied to the second cooking module 200 from the first power unit 120 (P8). When power is supplied from the first cooking module 100, the second cooking module 200 may convert power supplied from the first cooking module 100 into driving power of the second heating unit 210 so as to supply the driving power to the second heating unit 210, generate magnetic lines of force for heating the heating object based on the driving power, and emit the magnetic lines of force to the heating object (P9) to thereby perform the heating operation.

When the first cooking module 100 is operated such that power flows in the second cooking module 200, the first cooking module 100 may also be operated to emit first magnetic lines of force to the second cooking module 200 (P10). Here, the first cooking module 100 may convert power, supplied to the first power unit 120 from the power supply source 10, into the driving power so as to be supplied to the first heating unit 110, generate the first magnetic lines of force to be emitted to the second cooking module 200 based on the driving power, then emit the first magnetic lines of force to the second cooking module 200 (P10). As such, when the first magnetic lines of force are emitted from the first cooking module 100 (P10), the second cooking module 200 may amplify the received first magnetic lines of force to convert them into second magnetic lines of force, and emit the second magnetic lines of force to the heating object (P11). Here, as the second heating unit 210 receives the first magnetic lines of force and amplifies the received first magnetic lines of force to convert them into the second magnetic lines of force, and emits the second magnetic lines of force upwards (P11), allowing the second cooking module 200 to perform the heating operation. The second cooking module 200 may generate third magnetic lines of force based on power induced therein by the received first magnetic lines of force and emit the generated third magnetic lines of force to the heating object (P12). Here, as the coil portion 250 receives the first magnetic lines of force, the second power unit 220 converts power, induced in the coil portion 250 by the first magnetic lines of force received, into the driving power so as to be supplied to the second heating unit 210, and the second heating unit 210 generates the third magnetic lines of force to emit the generated third magnetic lines of force to the upper part of the second cooking module 200 to thereby heat the heating object.

Operation (Driving) System and Operation Method of a Cooking Appliance—Additional Embodiment Hereinafter, another embodiment of the cooking appliance according to the present disclosure will be described.

An [operation system and an operation method of a cooking appliance] according to the present disclosure may be implemented as a part of configurations or steps included in the following embodiments or a combination thereof, or implemented as a combination of embodiments. Technical terms used in this specification are used to merely illustrate specific embodiments, and therefore it should be understood that they are not intended to limit the present disclosure.

The embodiment of the cooking appliance 500 as described above may also be implemented as a system for controlling operation of a cooking appliance such as a system for operating a cooking appliance, a system for controlling a cooking appliance, and the like.

For example, in a system for controlling operation of a cooking appliance that includes a fixed cooking module 100 and a detachable cooking module 200, the system may be implemented as an operating system in which heating operation for an heating object is performed by the detachable cooking module 200 as power flows in the detachable cooking module 200 due to operation of the fixed cooking module 100 when the detachable module 200 is disposed on the fixed cooking module 100.

Figure 13:
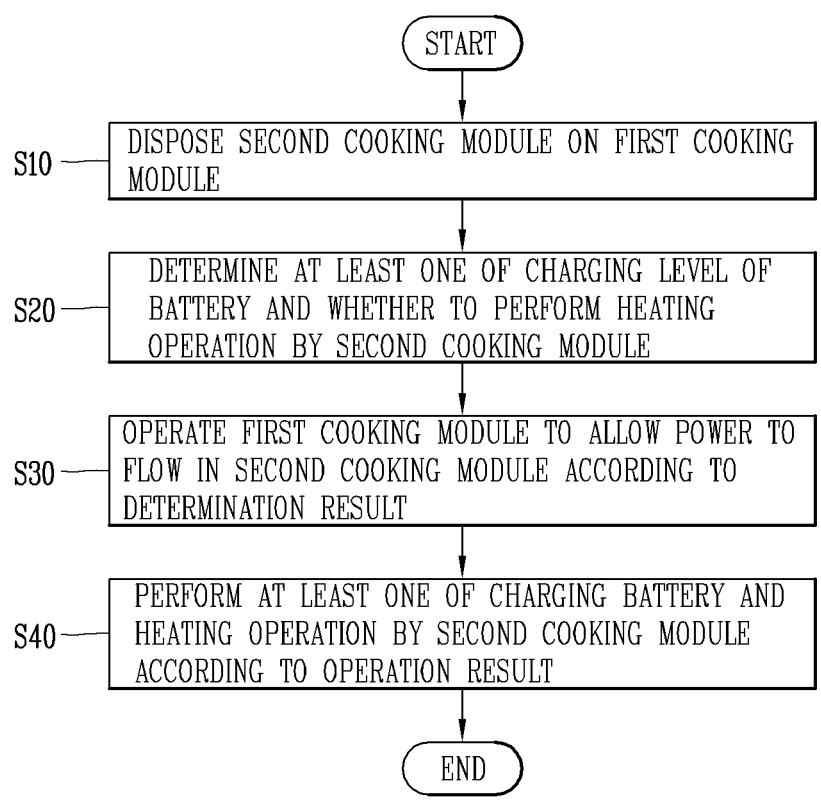
FIG. 13 is a flowchart illustrating a sequence of an operation method of a cooking appliance according to the present disclosure.

An operation method as illustrated in FIG. 13 may be applied to the cooking appliance 500 that can be implemented as a system.

FIG. 13 is a flow chart illustrating a sequence of an operation method of the cooking appliance 500 in which the first cooking module 100 and the second cooking module 200 are operated by being coupled to each other. The cooking appliance 500 may be operated according to the operation method illustrated in FIG. 13.

As illustrated in FIG. 13, the operation method includes disposing the second cooking module 200 on the first cooking module 100 (S10), determining at least one of a charging level of the battery 221 of the second cooking module 200 and whether to perform heating operation by the second cooking module 200 (S20), operating the first cooking module 100 to allow power to flow in the second cooking module 200 according to a result of the determination (S30), and performing at least one of charging the battery 221 and the heating operation by the second cooking module 200 according to a result of the operation (S40).

That is, when the first cooking module 100 and the second cooking module 200 are operated by being coupled to each other, the cooking appliance 500 may be operated in the order of disposing the second cooking module 200 on the first cooking module 100, determining at least one of the charging level of the battery 221 and whether to perform the heating operation by the second cooking module 200 (S20), operating the first cooking module 100 to allow power to flow in the second cooking module 200 (S30), and performing at least one of the charging the battery 221 and the heating operation by the second cooking module 200 (S40).

The disposing the second cooking module 200 on the first cooking module 100 (S10) is a step for disposing the second cooking module 200 on the first heating unit 110 of the first cooking module 100, which may be a step for the first cooking module 100 and the second cooking module 200 to be coupled to each other.

The determining at least one of the charging level of the battery 221 and whether to perform the heating operation by the second cooking module 200 (S20), when the second cooking module 200 is disposed on the first heating unit 110 (S10), may be a step of determining at least one of the charging level (status) of the battery 221 and whether to perform the heating operation by the second cooking module 200.

The operating the first cooking module 100 to allow power to flow in the second cooking module 200 (S30) may be a step in which the first cooking module 100 is operated according to a result of the determination of the charging level and the heating operation determined in the step S20.

In the operating the first cooking module 100 to allow power to flow in the second cooking module 200 (S30), power may flow in the second cooking module 200 according to the charging level, so that the first cooking module 100 may operate such that power is charged in the battery 221.

For example, the first cooking module 100 may operate such that power is supplied to the second cooking module 200 from at least one of the power supply source 10 and the first power unit 120, allowing power supplied from the first cooking module 100 to be charged in the battery 221.

In the operating the first cooking module 100 to allow power to flow in the second cooking module 200 (S30), power may flow in the second cooking module 200 according to whether or not the heating operation is performed by the second cooking module 200, so that the first cooking module 100 may be operated to allow the second cooking module 200 to perform the heating operation.

For example, the first cooking module 100 may operate such that power is supplied to the second cooking module 200 from at least one of the power supply source 10 and the first power unit 120, or operate such that the first magnetic lines of force that cause power to flow in the second cooking module 200 are emitted to the second cooking module 200, allowing the second cooking module 200 to perform the heating operation by power flowing therein as the first cooking module 100 is operated.

The performing at least one of the charging the battery 221 and the heating operation by the second cooking module 200 (S40) may be a step in which the second cooking module 200 performs at least one of charging the battery 221 and the heating operation based on power flowing therein as the first cooking module 100 is operated in the step S30.

In the performing at least one of the charging the battery 221 and the heating operation by the second cooking module 200 (S40), at least one of charging the battery 221 and the heating operation may be performed based on power supplied to the second cooking module 200 from at least one of the power supply source 10 and the first power unit 120.

Here, the second cooking module 200 may perform charging the battery 221 by converting power supplied from the first cooking module 100 into charging power for charging the battery 221.

In addition, the second cooking module 200 may perform the heating operation by converting power supplied from the first cooking module 100 into the driving power, and generating and emitting the magnetic lines of force based on the driving power.

In the performing at least one of the charging the battery 221 and the heating operation by the second cooking module 200 (S40), at least one of charging the battery 221 and the heating operation may be performed based on the first magnetic lines of force emitted to the second cooking module 200 from the first cooking module 100.

Here, the second cooking module 200 may perform charging the battery 221 by converting power, induced by the first magnetic lines of force received from the first cooking module 100, into charging power for charging the battery 221.

In addition, the second cooking module 200 may perform the heating operation by amplifying the first magnetic lines of force received from the first cooking module 100 to convert them into the second magnetic lines of force, or by converting power induced by the first magnetic lines of force into the driving power and emitting the third magnetic lines of force generated based on the driving power.

Although the present disclosure has been particularly shown and described with reference to embodiments thereof, it will be understood that various changes in form and details may be made therein without departing from the scope of the present disclosure as defined by the following claims. Therefore, the scope of the present disclosure is defined not by the detailed description of the embodiments, but by equivalents of the appended claims as well as the appended claims.

Although the present disclosure has been particularly shown and described with reference to exemplary embodiments, described herein, and drawings, it may be understood by one of ordinary skill in the art that various changes and modifications thereof may be made. Accordingly, the scope of the present disclosure should be defined by the following claims, and various changes equal or equivalent to the claims pertain to the category of the concept of the present disclosure.

REFERENCE NUMERALS

10: Power supply source 100: Cooking appliance (fixed cooking module, first cooking module)
110: First heating unit 120: First power unit
130: First control unit, 140: Contact portion
141: Contact 200: Cooking appliance (detachable cooking module, second cooking module)
210: Second heating unit, 220: Second power unit
221: Battery 230: Second control unit
240: Connection portion 250: Coil portion

The invention claimed is:
1. A cooking apparatus comprising:
a first cooking appliance including:
a first heating unit configured to generate and emit magnetic lines of force;
a first power unit configured to convert power supplied from a power supply source into driving power of the first heating unit and supply the driving power to the first heating unit; and a first control unit configured to control heating operation of the first cooking appliance by controlling operation of the first heating unit and power supply of the first power unit when a heating object is disposed on the first heating unit and, a second cooking appliance including:
a second heating unit configured to generate and emit magnetic lines of force;
a second power unit provided with a battery so as to convert power charged in the battery into driving power of the second heating unit and supply the driving power to the second heating unit and
a second control unit configured to control heating operation of the second cooking appliance by controlling operation of the second heating unit and power supply of the second power unit,
wherein the first control unit controls the first heating unit and the first power unit such that power flows in the second cooking appliance operated by power charged in the battery of the second cooking appliance when the second cooking appliance is disposed on the first heating unit in a stacked manner, and
wherein the second cooking appliance heats the heating object when the heating object is disposed on the second cooking appliance by an induction heating method.

2. The cooking apparatus of claim 1, wherein an upper surface of the first cooking appliance on which the first heating unit is provided is in contact with a lower surface of the second cooking appliance when the second cooking appliance is disposed on the first heating unit.

3. The cooking apparatus of claim 2, further comprising a contact portion provided at one side of the upper surface of the first cooking appliance to be in contact with the second cooking appliance.

4. The cooking apparatus of claim 2, further comprising a contact that is in contact with one point of the second cooking appliance, so as to be electrically connected to the second cooking appliance.

5. The cooking apparatus of claim 4, wherein the contact is connected to at least one of the power supply source and the first power unit, so as to provide electrical connection between the second cooking appliance and the at least one of the power supply source and the first power unit, and
wherein the first control unit controls such that power is supplied to the second cooking appliance from the power supply source or the first power unit through the contact.

6. The cooking apparatus of claim 1, wherein the first control unit detects a change in state of the first heating unit according to an object placed on the first heating unit to determine whether the second cooking appliance is disposed on the first heating unit based on a result of the detection.

7. The cooking apparatus of claim 1, wherein the first control unit, when controlling heating operation of the first cooking appliance as an object to be heated is placed on the first heating unit, controls such that the first power unit supplies the driving power to the first heating unit, and the first heating unit generates the magnetic lines of force based on the driving power to emit the magnetic lines of force to the object to be heated.

8. The cooking apparatus of claim 1, wherein the first control unit, when the second cooking appliance is disposed on the first heating unit, determines a charging level of the battery to control the first heating unit and the first power unit so that power flows in the second cooking appliance according to a result of the determination.

9. The cooking apparatus of claim 1, wherein the first control unit, when the second cooking appliance heats an object to be heated while being disposed on the first heating unit, controls such that the first power unit supplies the driving power to the first heating unit, and the first heating unit generates first magnetic lines of force based on the driving power so as to be emitted to the second cooking appliance.

10. The cooking apparatus of claim 9, wherein the first heating unit emits the first magnetic lines of force to an upper part of the second cooking appliance, and
wherein the second cooking appliance heats the object to be heated by amplifying the first magnetic lines of force to be converted into second magnetic lines of force and emitting the second magnetic lines of force.

11. The cooking apparatus of claim 9, wherein the first heating unit emits the first magnetic lines of force so that power is induced in the second cooking appliance by the first magnetic lines of force, and wherein the second cooking appliance heats the object to be heated by generating third magnetic lines of force based on the power induced by the first magnetic lines of force and emitting the third magnetic lines of force to the object to be heated.

12. The cooking apparatus of claim 9, wherein the second cooking appliance converts power induced by the first magnetic lines of force into charging power for charging the battery and stores the charging power in the battery.

* * * * *